(12) United States Patent
Corpus et al.

(10) Patent No.: US 11,242,897 B2
(45) Date of Patent: Feb. 8, 2022

(54) COUPLING ASSEMBLY HAVING ANGLED FASTENER HOLES

(71) Applicant: DANA AUTOMOTIVE SYSTEMS GROUP, LLC, Maumee, OH (US)

(72) Inventors: Christopher B. Corpus, Grand Rapids, OH (US); Bao T. Luong, Lambertville, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 381 days.

(21) Appl. No.: 16/346,389

(22) PCT Filed: Nov. 1, 2017

(86) PCT No.: PCT/US2017/059453
§ 371 (c)(1),
(2) Date: Apr. 30, 2019

(87) PCT Pub. No.: WO2018/132153
PCT Pub. Date: Jul. 19, 2018

(65) Prior Publication Data
US 2021/0285501 A1 Sep. 16, 2021

Related U.S. Application Data

(60) Provisional application No. 62/415,701, filed on Nov. 1, 2016.

(51) Int. Cl.
*F16D 3/32* (2006.01)
*F16D 1/076* (2006.01)
(Continued)

(52) U.S. Cl.
CPC .............. *F16D 3/32* (2013.01); *F16D 1/076* (2013.01); *F16D 3/845* (2013.01);
(Continued)

(58) Field of Classification Search
CPC . F16D 3/32; F16D 1/076; F16D 3/845; F16D 2003/22323; F16D 2003/22326;
(Continued)

(56) References Cited

U.S. PATENT DOCUMENTS 1,950,207 A * 3/1934 Anderson ................. F16D 1/06
2,227,116 A 12/1940 Hans
(Continued)

FOREIGN PATENT DOCUMENTS

| FR | 1.560.109 | * | 3/1969 | .................... 464/134 |
| GB | 1176771 | | 1/1970 | |

OTHER PUBLICATIONS

European Patent Office, International Search Report and Written Opinion in Application No. PCT/US2017/059453, dated Jul. 18, 2018, 12 pages. Rijswijk, Netherlands.

*Primary Examiner* — Greg Binda
(74) *Attorney, Agent, or Firm* — Marshall & Melhorn, LLC

(57) ABSTRACT

A coupling assembly having a first member drivingly connected to a second member via one or more third members. A first shaft is drivingly connected to the first member and a second shaft is drivingly connected to the second member. The second member includes a flange portion having one or more seating portions on a first end portion of the flange. Additionally, the flange has one or more flange portion attachment apertures extending from the seating portions to a second end portion of the flange. An increased diameter portion of the second shaft has one or more increased diameter portion apertures extending from a first end portion to a second end portion. The flange portion apertures and the increased diameter portion apertures have a center-line with an angle from an axial center-line of the assembly. Addi-
(Continued)

tionally, the seating portions have an angle relative to a radial center-line of the assembly.

12 Claims, 17 Drawing Sheets

(51) Int. Cl.
 *F16D 3/84* (2006.01)
 *F16D 3/223* (2011.01)
(52) U.S. Cl.
 CPC .............. *F16D 2003/22323* (2013.01); *F16D 2003/22326* (2013.01); *F16D 2300/06* (2013.01); *F16D 2300/08* (2013.01); *Y10S 464/906* (2013.01); *Y10T 403/76* (2015.01)
(58) Field of Classification Search
 CPC ............. F16D 2300/08; F16D 2300/06; Y10T 403/76; Y10S 464/906
 USPC .................................. 464/134, 182; 403/337
 See application file for complete search history.

(56) References Cited

U.S. PATENT DOCUMENTS

| | | | |
|---|---|---|---|
| 2,273,920 A | | 2/1942 | Anderson |
| 2,577,692 A | * | 12/1951 | Slaght ........................ F16D 3/41 |
| 3,338,070 A | * | 8/1967 | Scott ......................... F16D 3/24 464/906 |
| 3,613,398 A | * | 10/1971 | Hasegawa ............... F16D 3/227 464/906 |
| 3,887,024 A | | 6/1975 | Takahashi |
| 4,000,628 A | | 1/1977 | Funatani |
| 4,028,909 A | | 6/1977 | Jancic |
| 4,116,020 A | * | 9/1978 | Aucktor ................ F16D 3/2237 464/906 |
| 4,253,776 A | * | 3/1981 | Orain ..................... F16D 1/072 403/337 |
| 4,747,806 A | | 5/1988 | Krude |
| 5,083,471 A | | 1/1992 | Ehret |
| 5,234,271 A | | 8/1993 | Lindstroem |
| 5,643,090 A | | 7/1997 | Smith |
| 5,769,720 A | | 6/1998 | Aiken |
| 6,001,018 A | * | 12/1999 | Breese .................... F16D 3/387 464/134 |
| 6,113,498 A | | 9/2000 | Breese |
| 6,257,986 B1 | | 7/2001 | Duggan |
| 6,328,654 B1 | | 12/2001 | Brissette |
| 6,454,656 B2 | | 9/2002 | Brissette |
| 6,454,657 B1 | | 9/2002 | Duggan |
| 6,471,406 B1 | | 10/2002 | Cadle |
| 6,540,617 B2 | | 4/2003 | Lindenthal |
| 7,213,999 B2 | | 5/2007 | Haas |
| 7,322,750 B1 | | 1/2008 | Besselman |
| 8,182,351 B2 | | 5/2012 | Szuba |
| 8,690,689 B1 | | 4/2014 | Narvaez |
| 8,771,092 B2 | | 7/2014 | Fujio |
| 9,605,716 B2 | | 3/2017 | Ishikura |
| 2014/0357383 A1 | | 12/2014 | Ishikura |

\* cited by examiner

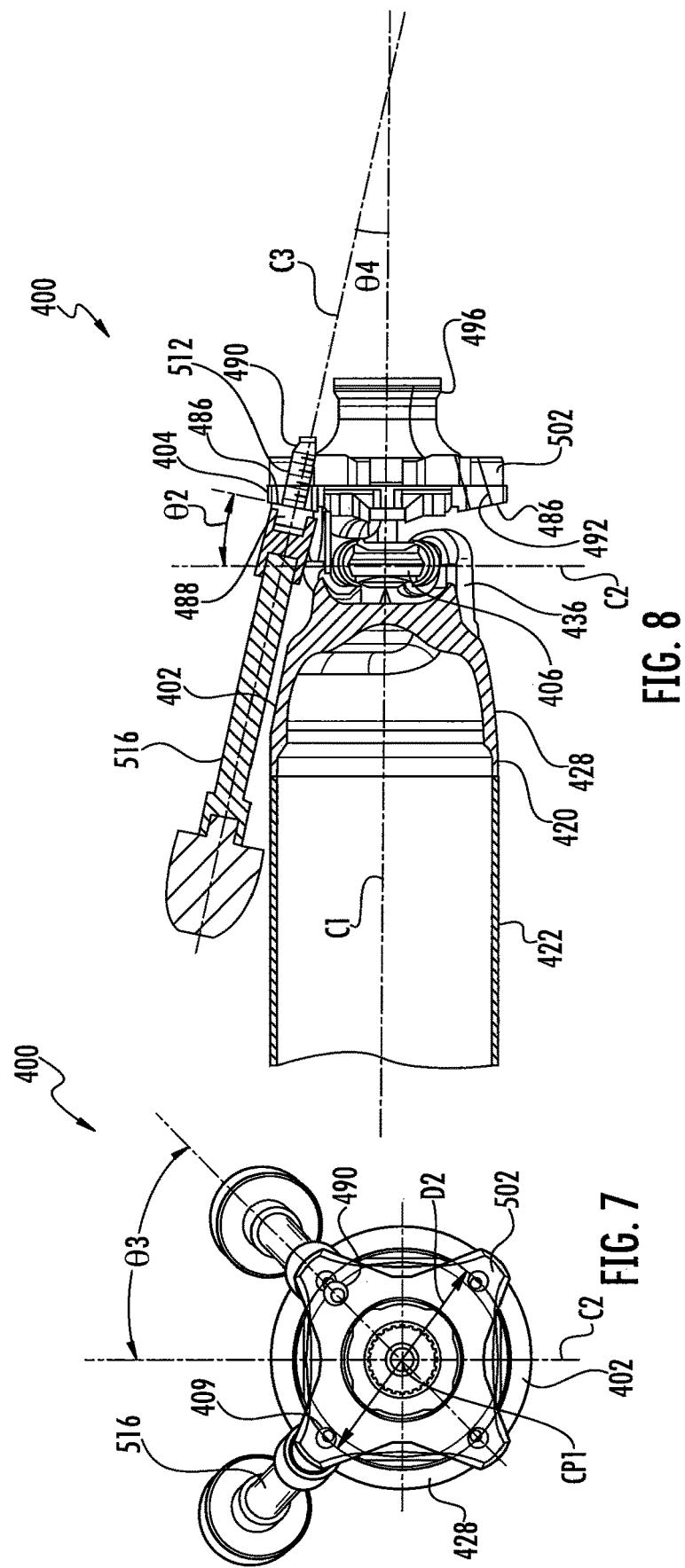

COUPLING ASSEMBLY HAVING ANGLED FASTENER HOLES

CROSS-REFERENCE TO RELATED APPLICATIONS

This application is the National Stage of International Application No. PCT/US2017/059453, filed Nov. 1, 2017, which claims the benefit of U.S. Provisional Patent Application No. 62/415,701, filed on Nov. 1, 2016, which is incorporated herein by reference in its entirety.

FIELD OF THE DISCLOSURE

The present disclosure relates to a coupling assembly for use in a motor vehicle.

BACKGROUND OF THE DISCLOSURE

It is well-known within the automotive industry to use one or more drive shaft or propeller shaft assemblies in order to transfer the torque and/or rotational energy from one vehicle drive-train component to another vehicle drive-train component. Conventional drive shaft assemblies include a drive shaft with a coupling assembly that is attached to each end of the drive shaft. The coupling assembly drivingly connects the drive shaft to another component within the drive-train of the vehicle.

Conventional joint assemblies, such as a universal joint assembly, include a yoke portion that is integrally connected to an end of the drive shaft. The yoke portion on the end of the drive shaft is then drivingly connected to a flange yoke via a journal cross. The flange yoke of the universal joint assembly includes a flange portion having a plurality of attachment apertures that are drilled into the flange portion of the flange yoke.

Typically, a companion flange is disposed axially outboard from and adjacent to the flange yoke of the joint assembly. The companion flange is then drivingly connects the drive shaft to another component within the drive-train of the vehicle. Additionally, the companion flange has a plurality of attachment apertures that are complementary to the plurality of attachment apertures in the flange portion of the flange yoke of the joint assembly.

In conventional joint assemblies, the plurality of attachment apertures in the flange portion of the flange yoke and the plurality of attachment apertures in the companion flange are drilled horizontally into the flange portion of the flange yoke and the companion flange. This makes it more complicated to install and assemble the drive shaft assembly during manufacturing and assembly of the vehicle. Additionally, the conventional joint assemblies make the removal, replacement and/or re-installation of the drive shaft assembly more complicated when making repairs to the vehicle. By drilling the plurality of attachment apertures in the companion flange and the plurality of apertures in the flange portion of the flange yoke horizontally, it makes it impossible to remove, replace and/or install the drive shaft assembly using standard installation and removal tools without hitting the other vehicle drive-train components near the drive shaft assembly. As a result, the components of the coupling assembly are required to have intricately machined components and require the use of specially designed tools in order to remove, replace and/or install the drive shaft assembly. This increases the overall costs associated with the drive shaft assembly. It would therefore be advantageous to develop a coupling assembly for a drive shaft assembly with indexing capabilities that is easy to remove, replace and/or install using standard tools.

SUMMARY OF THE DISCLOSURE

A coupling assembly for use in a motor vehicle. The coupling assembly has a first member that is drivingly connected to a second member via one or more third members. At least a portion of a first shaft is drivingly connected to at least a portion of the first member of the coupling assembly and at least a portion of a second shaft is drivingly connected to at least a portion of the second member of the coupling assembly.

The second member of the coupling assembly has a flange portion having an outer surface, a first end portion and a second end portion. Extending along at least a portion of the outer surface of the first end portion of the flange portion of the second member is one or more seating portions. The one or more seating portions of the flange portion of the second member extend along at least a portion of the outer surface of the first end portion of the flange portion of the second member at an angle θ2 relative to a radial center-line C2 of said coupling assembly.

Extending from the one or more seating portions on the first end portion of the flange portion of the second member to the second end portion of the flange portion is one or more flange portion attachment apertures. The one or more flange portion attachment apertures have a size and shape to receive and/or retain at least a portion of one or more mechanical fasteners.

Circumferentially extending from at least a portion of an outer surface of a first end portion of the second shaft is an increased diameter portion having a first end portion and a second end portion. Extending from the first end portion to the second end portion of the increased diameter portion of the second shaft is one or more increased diameter attachment apertures having a size and shape to receive and/or retain at least a portion of the one or more mechanical fasteners. The one or more increased diameter portion attachment apertures are complementary to and aligned with the one or more flange portion attachment apertures in the second member of the coupling assembly.

The one or more flange portion attachment apertures of the second member and the one or more increased diameter portion attachment apertures of the second shaft have a center-line C3 that is disposed at an angle θ4 relative to an axial center-line C1 of the coupling assembly. Additionally, the one or more flange portion attachment apertures and the one or more increased diameter portion attachment apertures are disposed along an angle θ3 relative to the radial center-line C2 of the coupling assembly.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 7 is a schematic view of a portion of the coupling assembly according to the embodiment of the disclosure illustrated in FIGS. 4-6;

FIG. 8 is a partial cut-away schematic side view of a portion of the coupling assembly according to the embodiment of the disclosure illustrated in FIGS. 4-7;

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the coupling assembly disclosed herein may be used in automotive, off-road vehicle, all-terrain vehicle, construction, structural, marine, aerospace, locomotive, military, machinery, robotic and/or consumer product applications. Additionally, as a non-limiting example, the coupling assembly disclosed herein may also be used in passenger vehicle, electric vehicle, hybrid vehicle, commercial vehicle and/or heavy vehicle applications.

Figure 1:
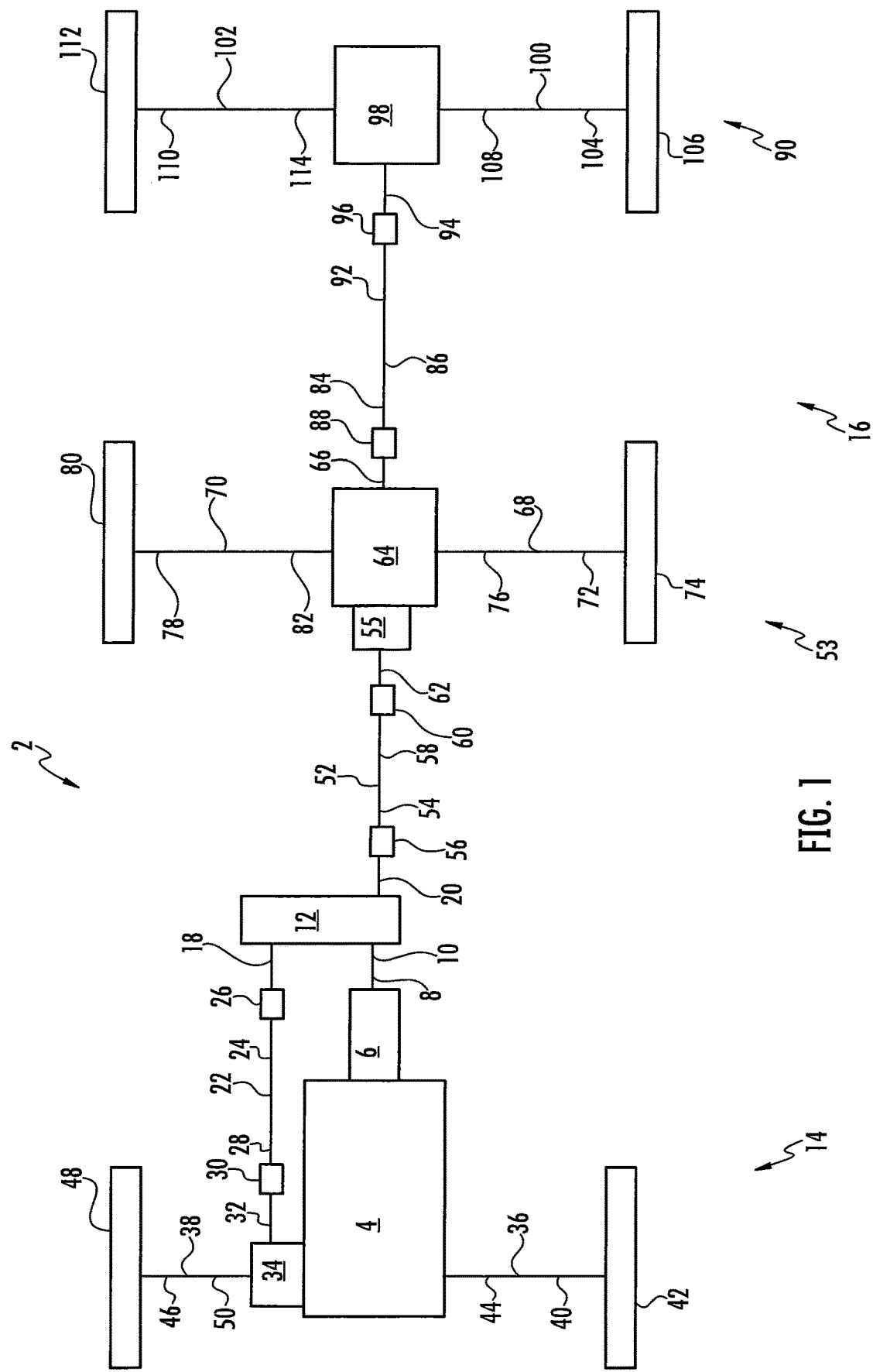
FIG. 1 is a schematic top-plan view of a vehicle having one or more coupling assemblies according to an embodiment of the disclosure.
Figure 2:
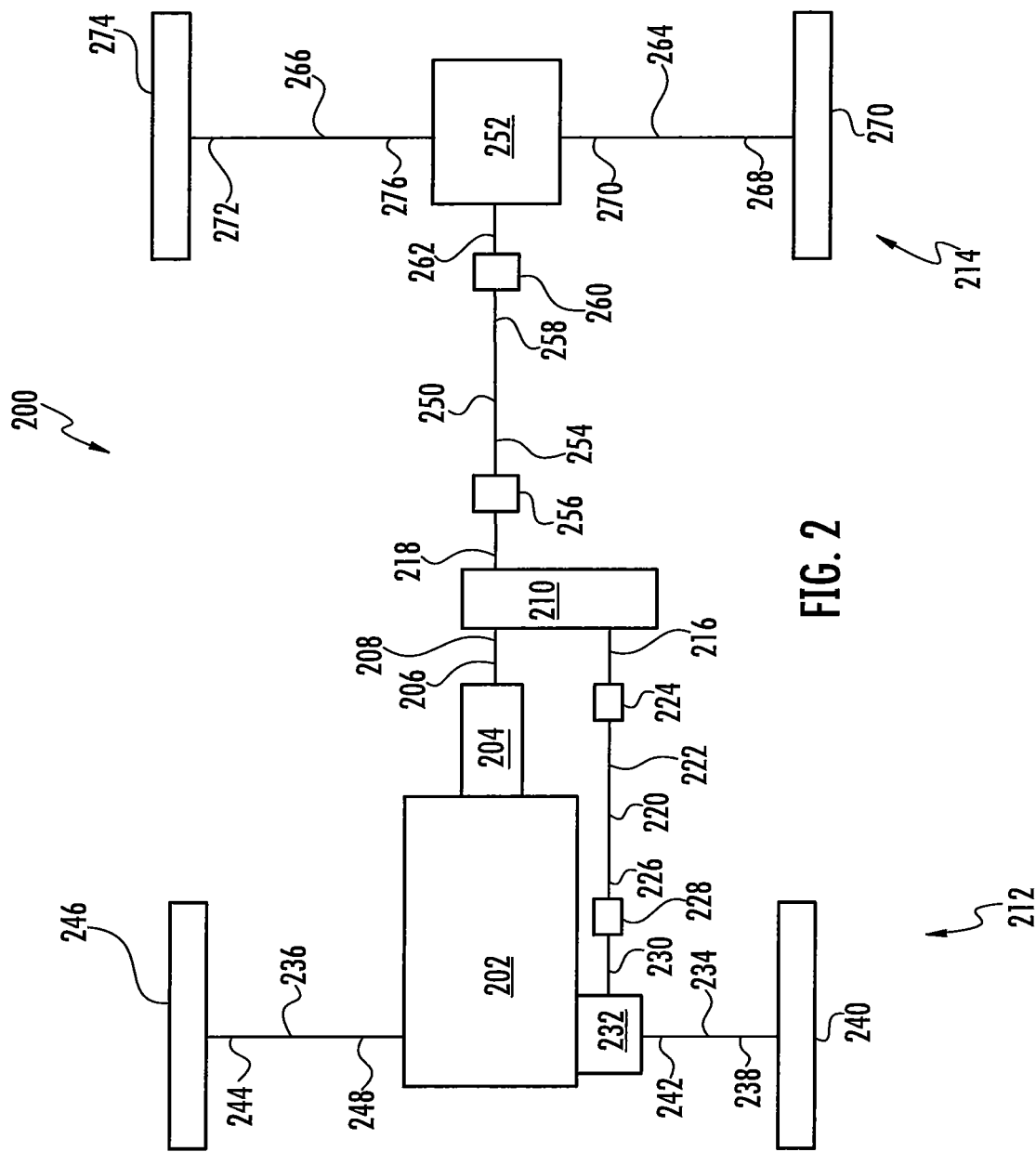
FIG. 2 is a schematic top-plan view of another vehicle having one or more coupling assemblies according to an embodiment of the disclosure.

FIG. 1 is a schematic top-plan view of a vehicle 2 having one or more coupling assemblies according to an embodiment of the disclosure. The vehicle 2 has an engine 4 which is drivingly connected to a transmission 6. A transmission output shaft 8 is drivingly connected to an end of the transmission 6 opposite the engine 4. The transmission 6 is a power management system which provides controlled application of the rotational power generated by the engine 4 by means of a gear box.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and a tandem axle system 16 by utilizing a series of gears and drive shafts. The transfer case 12 includes a first transfer case output shaft 18 and a second transfer case output shaft 20.

A first drive shaft 22 extends from the first transfer case output shaft 18 to the forward axle system 14 of the vehicle 2. A first end portion 24 of the first drive shaft 22 is drivingly connected to an end of the first transfer case output shaft 18 opposite the transfer case 12 via a first coupling assembly 26. As a non-limiting example, the first coupling assembly 26 is a universal joint, a U-joint, a universal coupling, a cardan joint, a double cardan joint, a Hooke's joint, a Spicer joint, a homokinetic coupling, a constant velocity joint or a Hardy Spicer joint. A second end portion 28 of the first drive shaft 22 is drivingly connected to a second coupling assembly 30. As a non-limiting example, the second coupling assembly 30 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the second coupling assembly 30, opposite the first drive shaft 22, is an end of a forward axle system input shaft 32. In accordance with an embodiment of the disclosure and as a non-limiting example, the forward axle system input shaft 32 is a forward axle differential input shaft, a coupling shaft, stub shaft or a forward axle differential pinion shaft. Drivingly connected to an end of the forward axle system input shaft 32, opposite the first drive shaft 22, is a forward axle differential 34. The forward axle differential 34 is a set of gears that allows the outer drive wheel(s) of the wheeled vehicle to rotate at a faster rate that the inner drive wheel(s). The rotational power is transmitted through the forward axle system 14 as described in more detail below.

The forward axle system 14 further includes a first forward axle half shaft 36 and a second forward axle half shaft 38. The first forward axle half shaft 36 extends substantially perpendicular to the forward axle system input shaft 32. A first end portion 40 of the first forward axle half shaft 36 is drivingly connected to a first forward axle wheel assembly 42 and a second end portion 44 of the first forward axle half shaft 36 is drivingly connected to an end of the forward axle differential 34. In accordance with an embodiment of the disclosure and as a non-limiting example, the second end portion 44 of the first forward axle half shaft 36 is drivingly connected to a forward axle differential side gear, a separate stub shaft, a separate coupling shaft, a first forward axle differential output shaft and/or a shaft that is formed as part of a forward axle differential side gear.

The second forward axle half shaft 38 also extends substantially perpendicular to the forward axle system input shaft 32. A first end portion 46 of the second forward axle half shaft 38 is drivingly connected to a second forward axle wheel assembly 48. A second end portion 50 of the second forward axle half shaft 38 is drivingly connected to an end of the forward axle differential 34 opposite the first forward axle half shaft 36. As a non-limiting example, the second end portion 50 of the second forward axle half shaft 83 is drivingly connected to a forward axle differential side gear, a separate stub shaft, a separate coupling shaft, a second forward axle differential output shaft and/or a shaft that is formed as part of a forward axle differential side gear.

An end of the second transfer case output shaft 20 is drivingly connected to an end of the transfer case 12 opposite the transfer case input shaft 10. A second drive shaft 52 extends from the second transfer case output shaft 20 to a forward tandem axle system 53 of the tandem axle system 16 having an inter-axle differential 55. A first end portion 54 of the second drive shaft 52 is drivingly connected to an end of the second transfer case output shaft 20, opposite the transfer case 12, via a third coupling assembly 56. As a non-limiting example, the third coupling assembly 56 is a universal joint, a U-joint, a universal coupling, a cardan joint, a double cardan joint, a Hooke's joint, a Spicer joint, a homokinetic coupling, a constant velocity joint or a Hardy Spicer joint.

According to an embodiment of the disclosure (not shown), the vehicle does not include a transfer case. In accordance with this embodiment of the disclosure (not shown), the transmission output shaft 8 is drivingly connected to an end of the second drive shaft 52 via the third coupling assembly 56. The rotational power is then transferred through the remainder of the drive-train of the vehicle 2 as described in more detail below.

A second end portion 58 of the second drive shaft 52 is drivingly connected to a fourth coupling assembly 60. As a non-limiting example, the coupling assembly 60 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the fourth coupling assembly 60, opposite the second drive shaft 52, is an end of a forward tandem axle system input shaft 62 of the forward tandem axle system 53. In accordance with an embodiment of the disclosure and as a non-limiting example, the forward tandem axle system input shaft 62 is an inter-axle differential input shaft, a coupling shaft, stub shaft or an inter-axle differential pinion shaft. The inter-axle differential 55 is a device that divides the rotational power generated by the engine 2 between the axles in a vehicle 2. The rotational power is transmitted through the forward tandem axle system as described in more detail below.

As illustrated in FIG. 1 of the disclosure, the inter-axle differential 55 is drivingly connected to a forward tandem axle differential 64 and a forward tandem axle system output shaft 66. The forward tandem axle differential 64 is a set of gears that allows the outer drive wheel(s) of a wheeled vehicle to rotate at a faster rate than the inner drive wheel(s).

The forward tandem axle system 53 further includes a first forward tandem axle half shaft 68 and a second forward tandem axle half shaft 70. The first forward tandem axle half shaft 68 extends substantially perpendicular to the second drive shaft 52. A first end portion 72 of the first forward tandem axle half shaft 68 is drivingly connected to a first forward tandem axle wheel assembly 74 and a second end portion 76 of the first forward tandem axle half shaft 68 is drivingly connected to an end of the forward tandem axle differential 64. As a non-limiting example, the second end portion 76 of the first forward tandem axle half shaft 68 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the second drive shaft 52 is the second forward tandem axle half shaft 70. A first end portion 78 of the second forward tandem axle half shaft 70 is drivingly connected to a second forward tandem axle wheel assembly 80 and a second end portion 82 of the second forward tandem axle half shaft 70 is drivingly connected to an end of the forward tandem axle differential 64 opposite the first forward tandem axle half shaft 68. As a non-limiting example, the second end portion 82 of the second forward tandem axle half shaft 70 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 66 is drivingly connected to a side of the inter-axle differential 55 opposite the second drive shaft 52. An end of the forward tandem axle system output shaft 66, opposite the inter-axle differential 55, is drivingly connected to a first end portion 84 of a third drive shaft 86 via a fifth coupling assembly 88. In accordance with an embodiment of the disclosure and as a non-limiting example, the fifth coupling assembly 88 is a universal joint, a U-joint, a universal coupling, a cardan joint, a double cardan joint, a Hooke's joint, a Spicer joint, a homokinetic coupling, a constant velocity joint or a Hardy Spicer joint. The third drive shaft 86 drivingly connects the forward tandem axle system 53 to a rear tandem axle system 90 of the tandem axle system 16 of the vehicle 2.

A second end portion 92 of the third drive shaft 86 is drivingly connected to an end of a rear tandem axle system input shaft 94 via a sixth coupling assembly 96. As a non-limiting example, the sixth coupling assembly 94 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the sixth coupling assembly 96, opposite the third drive shaft 86, is an end of a rear tandem axle input shaft 94. In accordance with an embodiment of the disclosure and as a non-limiting example, the rear tandem axle input shaft 94 is a rear tandem axle differential input shaft, a coupling shaft, stub shaft or a rear tandem axle differential pinion shaft. Drivingly connected to an end of the rear tandem axle input shaft 94, opposite the third drive shaft 86, is a rear tandem axle differential 98. The rear tandem axle differential 98 is a set of gears that allows the outer drive wheel(s) of a wheeled vehicle to rotate at a faster rate that the inner drive wheel(s). The rotational power is transmitted through the rear tandem axle system 90 as described in more detail below.

The rear tandem axle system further includes a first rear tandem axle half shaft 100 and a second rear tandem axle half shaft 102. The first rear tandem axle half shaft 100 extends substantially perpendicular to the rear tandem axle input shaft 94. A first end portion 104 of the first rear tandem axle half shaft 100 is drivingly connected to a first rear tandem axle wheel assembly 106 and a second end portion of the first rear tandem axle half shaft 100 is drivingly connected to an end of the rear tandem axle differential 98. As a non-limiting example, the second end portion 108 of the first rear tandem axle half shaft 100 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 94 is the second rear tandem axle half shaft 102. A first end portion 110 of the second rear tandem axle half shaft 102 is drivingly connected to a second rear tandem axle wheel assembly 112. A second end portion 114 of the second rear tandem axle half shaft 102 is drivingly connected to an end of the rear tandem axle differential 98 opposite the first rear tandem axle half shaft 100. As a non-limiting example, the second end of the second rear tandem axle half shaft is drivingly connected to a rear tandem axle differential side gear, a separate stub shaft, a separate coupling shaft, a second rear tandem axle differential output shaft and/or a shaft that is formed as part of a rear tandem axle differential side gear.

It is within the scope of this disclosure that one or more of the coupling assemblies 26, 30, 56, 60, 88 and/or 96 of the vehicle 2 may be a coupling assembly according to an embodiment of the disclosure.

Figure 3:
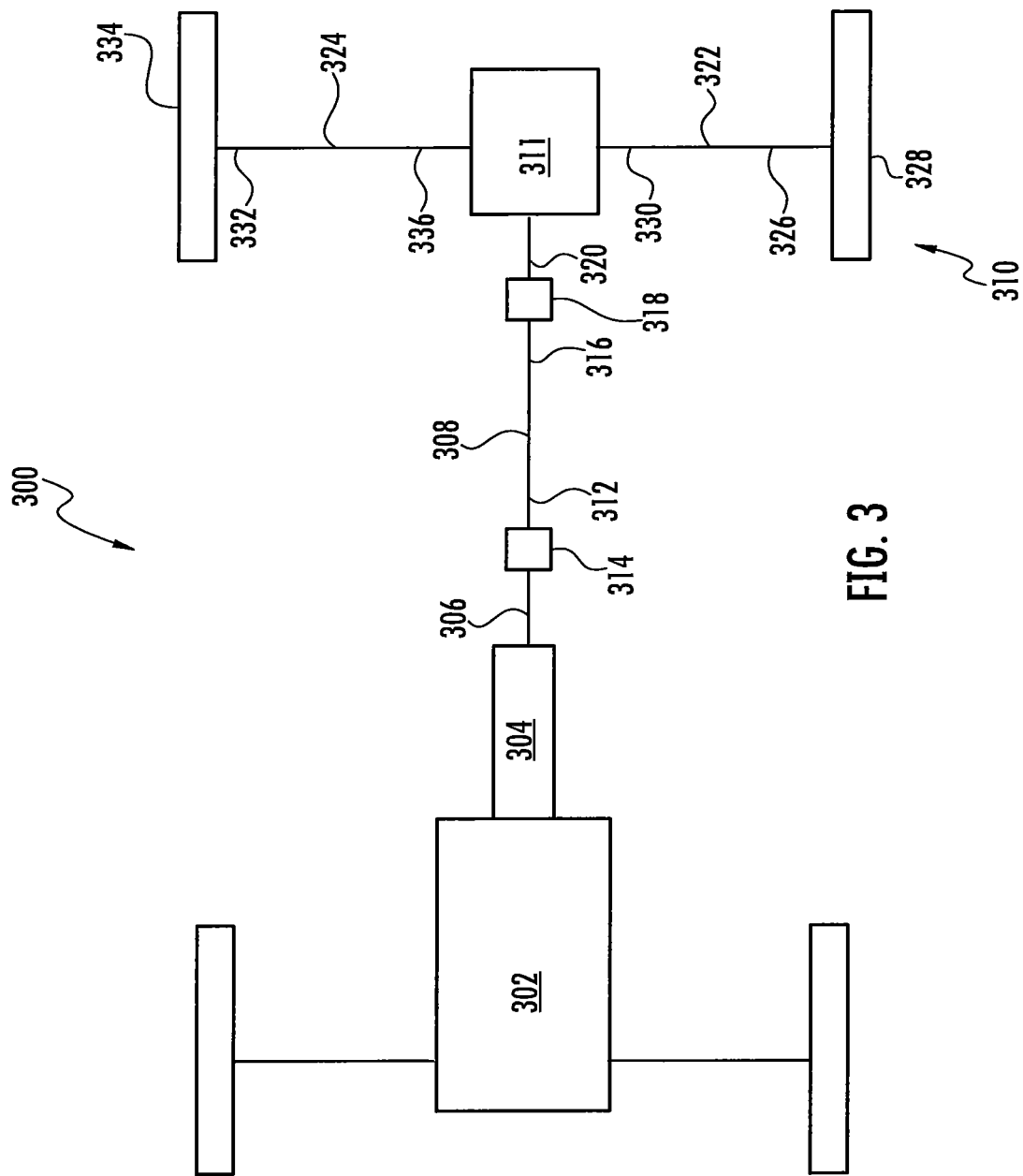
FIG. 3 is a schematic top-plan view of yet another vehicle having one or more coupling assemblies according to an embodiment of the disclosure.

FIG. 3 is a schematic top-plan view of a vehicle 200 having one or more coupling assemblies according to an alternative embodiment of the disclosure. The vehicle 200 has an engine 202 which is drivingly connected to a transmission 204. A transmission output shaft 206 is then drivingly connected to an end of the transmission 204 opposite the engine 202. As previously discussed, the transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used in four-wheel drive and/or all-wheel-drive (AWD) vehicles to transfer the rotational power from the transmission 204 to a forward axle system 212 and a rear axle system 214 by utilizing a series of gears and drive shafts. The transfer case 210 additionally allows the vehicle 200 to selectively operate in either a two-wheel drive mode of a four-wheel/AWD mode. The transfer case 210 includes a first transfer case output shaft 216 and a second transfer case output shaft 218.

A first drive shaft 220 extends from the first transfer case output shaft 216 to the forward axle system 212 of the vehicle 200. A first end portion 222 of the first drive shaft 220 is drivingly connected to an end of the first transfer case output shaft 216, opposite the transfer case 210, via a first coupling assembly 224. As a non-limiting example, the first coupling assembly 224 is a universal joint, a U-joint, a universal coupling, a cardan joint, a double cardan joint, a Hooke's joint, a Spicer joint, a homokinetic coupling, a constant velocity joint or a Hardy Spicer joint. A second end portion 226 of the first drive shaft 220 is drivingly connected to a second coupling assembly 228. As a non-limiting example, the second coupling assembly 228 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the second coupling assembly 228, opposite the first drive shaft 220, is an end of a forward axle system input shaft 230. In accordance with an embodiment of the disclosure and as a non-limiting example, the forward axle system input shaft 230 is a forward axle differential input shaft, a coupling shaft, stub shaft or a forward axle differential pinion shaft. Drivingly connected to an end of the forward axle system input shaft 230, opposite the first drive shaft 220, is a forward axle differential 232 of the forward axle system 212. The forward axle differential 232 is a set of gears that allows the outer drive wheel(s) of the wheeled vehicle to rotate at a faster rate that the inner drive wheel(s). The rotational power is transmitted through the forward axle system 212 as described in more detail below.

The forward axle system 212 further includes a first forward axle half shaft 234 and a second forward axle half shaft 236. The first forward axle half shaft 234 extends substantially perpendicular to the forward axle system input shaft 230. A first end portion 238 of the first forward axle half shaft 234 is drivingly connected to a first forward axle wheel assembly 240 and a second end portion 242 of the first forward axle half shaft 234 is drivingly connected to an end of the forward axle differential 232. As a non-limiting example, the second end portion 242 of the first forward axle half shaft 234 is drivingly connected to a forward axle differential side gear, a separate stub shaft, a separate coupling shaft, a first forward axle differential output shaft and/or a shaft that is formed as part of a forward axle differential side gear.

Extending substantially perpendicular to the forward axle system input shaft 230 is the second forward axle half shaft 236. A first end portion 244 of the second forward axle half shaft 236 is drivingly connected to a second forward axle wheel assembly 246. A second end portion 248 of the second forward axle half shaft 236 is drivingly connected to an end of the forward axle differential 232 opposite the first forward axle half shaft 234. As a non-limiting example, the second end portion 248 of the second forward axle half shaft 236 is drivingly connected to a forward axle differential side gear, a separate stub shaft, a separate coupling shaft, a second forward axle differential output shaft and/or a shaft that is formed as part of a forward axle differential side gear.

An end of the second transfer case output shaft 218 is drivingly connected to an end of the transfer case 210 opposite the transfer case input shaft 208. A second drive shaft 250 extends from the second transfer case output shaft 218 to a rear axle differential 252 of the rear axle system 214 of the vehicle 200. A first end portion 254 of the second drive shaft 250 is drivingly connected to an end of the second transfer case output shaft 218, opposite the transfer case 210, via a third coupling assembly 256. As a non-limiting example, the third coupling assembly 256 is a universal joint, a U-joint, a universal coupling, a cardan joint, a double cardan joint, a Hooke's joint, a Spicer joint, a homokinetic coupling, a constant velocity joint or a Hardy Spicer joint. A second end portion 258 of the second drive shaft 250 is drivingly connected to a fourth coupling assembly 260. As a non-limiting example, the fourth coupling assembly 260 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the fourth coupling assembly 260 is an end of a rear axle system input shaft 262. In accordance with an embodiment of the disclosure and as a non-limiting example, the rear axle system input shaft 262 is a rear axle differential input shaft, a coupling shaft, stub shaft or a rear axle differential pinion shaft. Drivingly connected to an end of the rear axle system input shaft 262, opposite the second drive shaft 250, is the rear axle differential 252. The rear axle differential 252 is a set of gears that allows the outer drive wheel(s) of the wheeled vehicle to rotate at a faster rate that the inner drive wheel(s). The rotational power is transmitted through the rear axle system 214 as described in more detail below.

The rear axle system 214 further includes a first rear axle half shaft 264 and a second rear axle half shaft 266. The first rear axle half shaft 264 extends substantially perpendicular to the rear axle system input shaft 262. A first end portion 268 of the first rear axle half shaft 264 is drivingly connected to a first rear axle wheel assembly 270 and a second end portion 270 of the first rear axle half shaft 264 is drivingly connected to an end of the rear axle differential 252. As a non-limiting example, the second end portion 270 of the first rear axle half shaft is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 262 is the second rear axle half shaft 266 of the rear axle system 214. A first end portion 272 of the second rear axle half shaft 266 is drivingly connected to a second rear axle wheel assembly 274. A second end portion 276 of the second rear axle half shaft 266 is drivingly connected to an end of the rear axle differential 252 opposite the first rear axle half shaft 264. As a non-limiting example, the second end portion 276 of the second rear axle half shaft 266 is drivingly connected to a rear axle differential side gear, a separate stub shaft, a separate coupling shaft, a second rear axle differential output shaft and/or a shaft that is formed as part of a rear axle differential side gear.

It is within the scope of this disclosure that one or more of the coupling assemblies 224, 228, 256 and/or 260 may be a coupling assembly according to an embodiment of the disclosure.

FIG. 3 is a schematic top-plan view of a vehicle 300 having one or more coupling assemblies according to another embodiment of the disclosure. The vehicle 300 has an engine 302 which is drivingly connected to a transmission 304. A transmission output shaft 306 is then drivingly connected to an end of the transmission 304 opposite the engine 302. The transmission is a power management system which provides controlled application of the rotational power generated by the engine by means of a gear box.

A drive shaft 308 extends from the transmission output shaft 306 and drivingly connects the transmission 304 to a rear axle differential 311 of a rear axle system 310 of the vehicle 300. A first end portion 312 of the drive shaft 308 is drivingly connected to the end of the transmission output shaft 306, opposite the transmission 304, via a first coupling assembly 314. As a non-limiting example, the first coupling assembly 314 is a universal joint, a U-joint, a universal coupling, a cardan joint, a double cardan joint, a Hooke's joint, a Spicer joint, a homokinetic coupling, a constant velocity joint or a Hardy Spicer joint. A second end portion 316 of the drive shaft 308 is drivingly connected to a second coupling assembly 318. In accordance with an embodiment of the disclosure and as a non-limiting example, the second coupling assembly 318 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the second coupling assembly 318 is an end of a rear axle input shaft 320. As a non-limiting example, the rear axle input shaft 320 is a differential input shaft, a coupling shaft, stub shaft or a differential pinion shaft. Drivingly connected to an end of the rear axle input shaft 320, opposite the drive shaft 308, is the rear axle differential 311 of the rear axle system 310 of the vehicle 300. The rear axle differential 311 is a set of gears that allows the outer drive wheel(s) of the wheeled vehicle to rotate at a faster rate that the inner drive wheel(s). The rotational power is transmitted through the rear axle system 310 as described in more detail below.

The rear axle system 310 further includes a first rear axle half shaft 322 and a second rear axle half shaft 324. The first rear axle half shaft 322 extends substantially perpendicular to the rear axle input shaft 320. A first end portion 326 of the first rear axle half shaft 322 is drivingly connected to a first rear axle wheel assembly 328 and a second end portion 330 of the first rear axle half shaft 322 is drivingly connected to an end of the rear axle differential 311. As a non-limiting example, the second end portion 330 of the first rear axle half shaft 322 is drivingly connected to a differential side gear, a separate stub shaft, a separate coupling shaft, a first rear axle differential output shaft and/or a shaft that is formed as part of a differential side gear.

Extending substantially perpendicular to the rear axle input shaft 320 is the second rear axle half shaft 324 of the rear axle system 310 of the vehicle 300. A first end portion 332 of the second rear axle half shaft 324 is drivingly connected to a second rear axle wheel assembly 334. A second end portion 336 of the second rear axle half shaft 324 is drivingly connected to an end of the rear axle differential 311 opposite the first rear axle half shaft 322. As a non-limiting example, the second end portion 336 of the second rear axle half shaft 324 is drivingly connected to a differential side gear, a separate stub shaft, a separate coupling shaft, a second rear axle differential output shaft and/or a shaft that is formed as part of a differential side gear.

It is within the scope of this disclosure that one or more of the coupling assemblies 314 and/or 318 may be a coupling assembly according to an embodiment of the disclosure.

Figure 4:
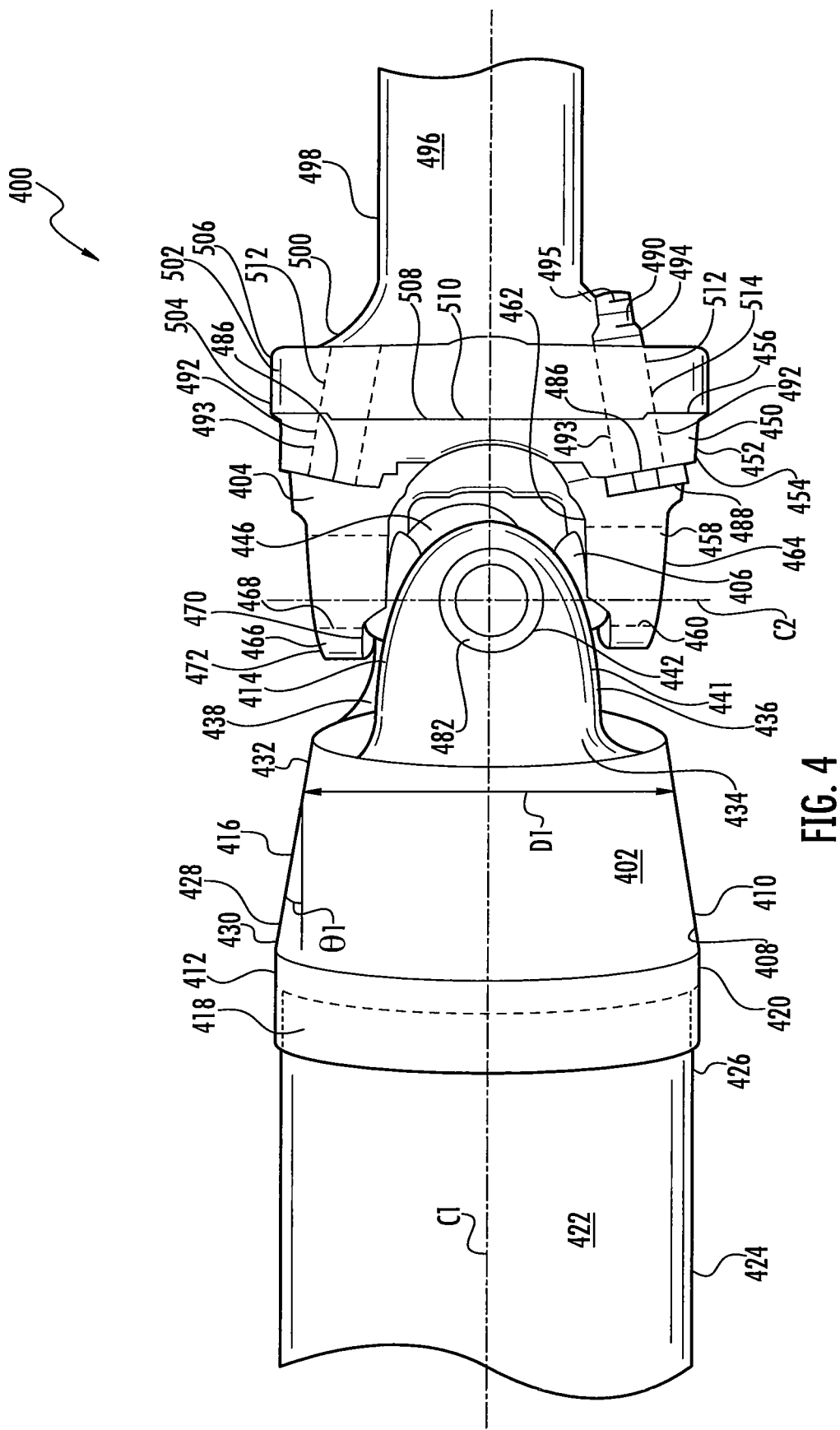
FIG. 4 is a schematic side-view of a coupling assembly according to an embodiment of the disclosure.
Figure 5:
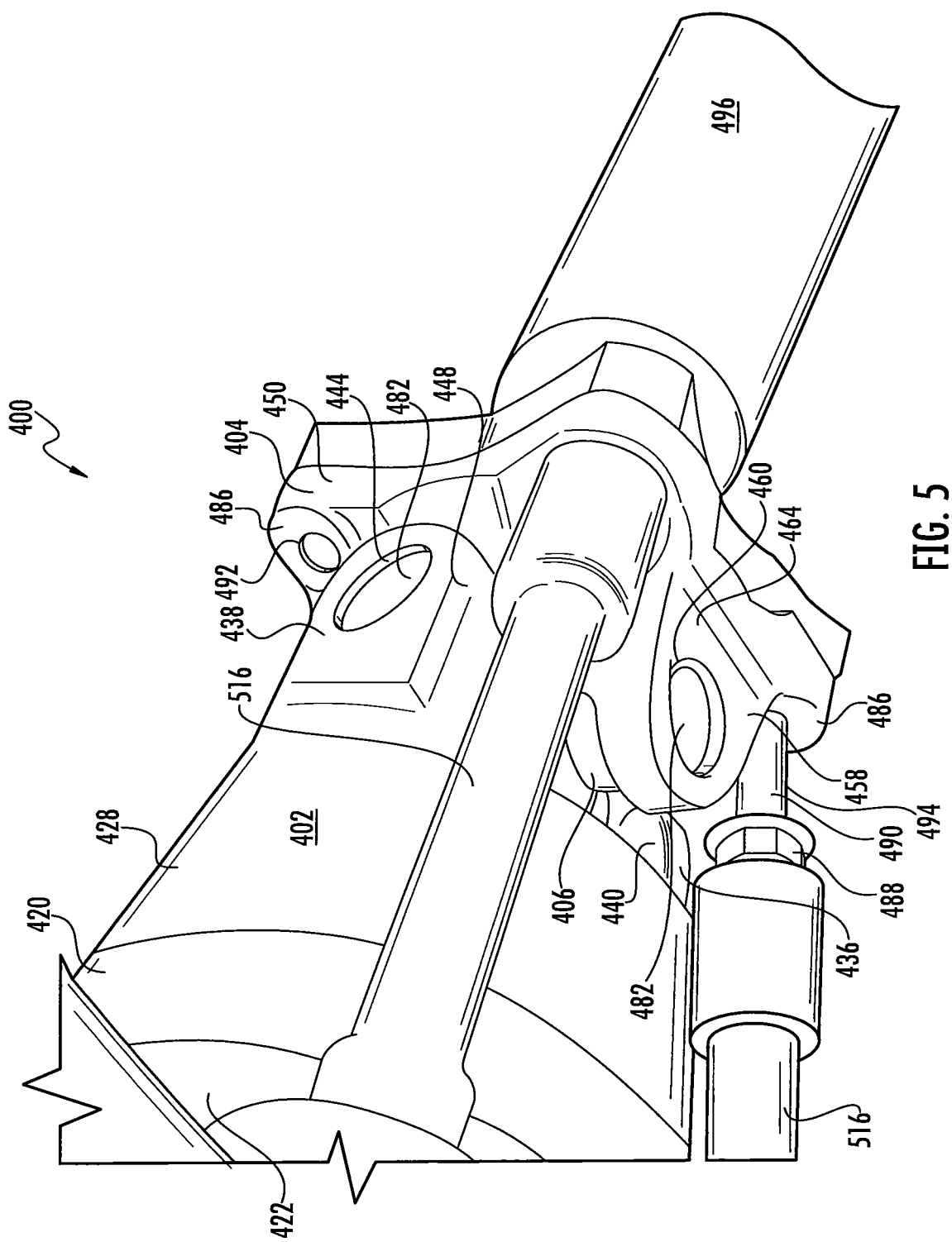
FIG. 5 is a schematic perspective view of the coupling assembly according to the embodiment of the disclosure illustrated in FIG. 4.
Figure 6:
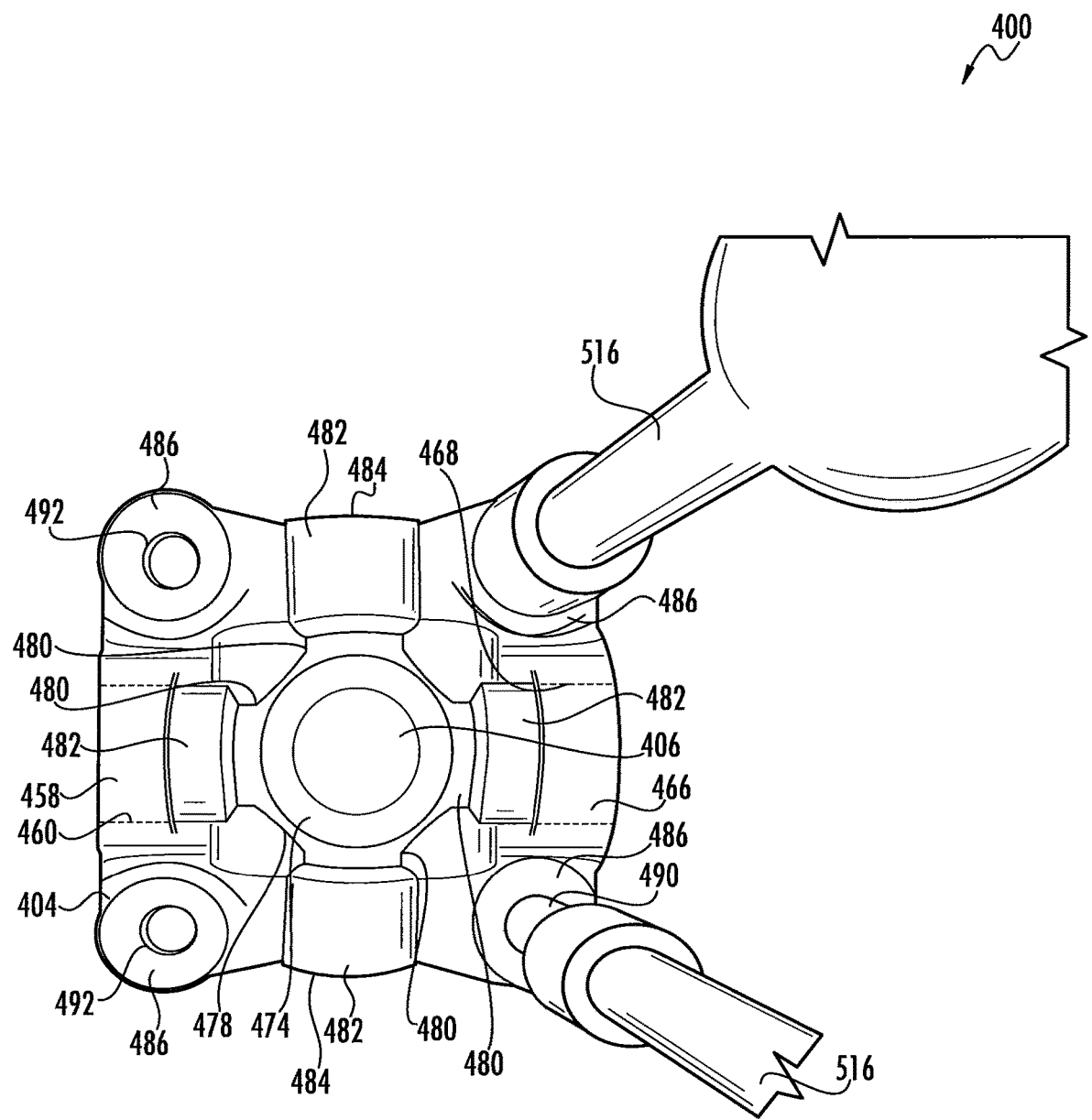
FIG. 6 is a schematic view of a portion of the coupling assembly according to the embodiment of the disclosure illustrated in FIGS. 4 and 5.

FIG. 4-8 schematically illustrate a coupling assembly 400 according to an embodiment of the disclosure. As best seen in FIGS. 4-6 of the disclosure and as a non-limiting example, the coupling assembly includes a first member 402 and a second member 404 that is drivingly connected to the first member 402 of the coupling assembly 400 by one or more third members 406. It is within the scope of this disclosure and as a non-limiting example, that the coupling assembly 400 may be a universal joint, a U-joint, a universal coupling, a cardan joint, a double cardan joint, a Hooke's joint, a Spicer joint or a Hardy Spicer joint. Additionally, it is within the scope of this disclosure and as a non-limiting example, that the first member 402, the second member 404 and/or the one or more third members 406 of the coupling assembly 400 may be made of an iron, steel, aluminium and/or any other material that is able to withstand the tension, compression, radial, axial and/or torsional loads that are exerted onto the coupling assembly 400.

As best seen in FIG. 4 of the disclosure and as a non-limiting example, the first member 402 of the coupling assembly 400 has an inner surface 408, an outer surface 410, a first end portion 412, a second end portion 414 and an intermediate portion 416 interposed between the first and second end portions 412 and 414 of the first member 402. The inner surface 408 ad the outer surface 410 of the first member 402 of the coupling assembly 400 defines a hollow portion 418 therein. In accordance with the embodiment of the disclosure illustrated in FIGS. 4, 5, 7 and 8 and as a non-limiting example, the first end portion 412 of the first member 402 of the coupling assembly 400 includes a substantially cylindrical attachment portion 420.

Drivingly connected to at least a portion of the substantially cylindrical attachment portion 420 of the first member 402 of the coupling assembly 400 is a first shaft 422 having an outer surface, a first end portion (not shown) and a second end portion 426. As best seen in FIG. 4 of the disclosure at least a portion of the second end portion 426 of the first shaft 422 is integrally connected to at least a portion of the substantially connected to at least a portion of the substantially cylindrical attachment portion 420 of the first member 402 of the joint assembly 400. In accordance with the embodiment of the disclosure illustrated in FIG. 4 and as a non-limiting example, at least a portion of the second end portion 426 of the first shaft 422 is received and/or retained within at least a portion of the hollow portion 418 of the substantially cylindrical attachment portion 420 of the first member 402 of the coupling assembly 400. It is within the scope of this disclosure and as a non-limiting example that the second end portion 426 of the first shaft 422 may be integrally connected to at least a portion of the substantially cylindrical attachment portion 420 of the first member 402 of the coupling assembly 400 by using one or more mechanical fasteners, one or more welds, one or more adhesives, a splines connections and/or a threaded connection. As a non-limiting example, the first shaft 422 may be a driveshaft, a driving shaft, a propeller shaft, a prop shaft a Cardan shaft and/or a double Cardan shaft.

At least a portion of the intermediate portion 416 of the first member 402 of the coupling assembly 400 is a tapered portion 428 having a first end portion 430 and a second end portion 432. As best seen in FIG. 4 of the disclosure and as a non-limiting example, at least a portion of the first end portion 430 of the tapered portion 428 of the first member 402 of the coupling assembly 400 is disposed directly adjacent to the substantially cylindrical attachment portion 420 of the first end portion 412 of the first member 402 of the coupling assembly 400. The tapered portion 428 of the first member 402 of the joint assembly 400 has a diameter D1 that decreases from the first end portion 430 to the second end portion 432 of the tapered portion 428. As illustrated in FIG. 4 of the disclosure, the outer surface 410 of the tapered portion 428 of the first member 402 of the joint assembly 400 has an angle θ1 relative to an axial center-line C1 of the coupling assembly 400. It is within the scope of this disclosure and as a non-limiting example that the tapered portion 428 of the first member 402 of the coupling assembly 400 is substantially frustroconical in shape.

In accordance with the embodiment of the disclosure illustrated in FIG. 4 and as a non-limiting example, at least a portion of the second end portion 414 of the first member 402 of the joint assembly 400 includes a yoke portion 434 having a first yoke arm 436 and a second yoke arm 438. As best seen in FIG. 4 and as a non-limiting example, the first and second yoke arms 436 and 438 of the first member 402 of the coupling assembly 400 extend outward from at least a portion of the second end portion 432 of the tapered portion 428 of the first member 402. It is within the scope of this disclosure and as a non-limiting example that the first member 402 of the joint assembly 400 may be an end yoke.

Extending from a first side 440 to a second side 441 of the first yoke arm 438 of the first member 402 of the joint assembly 400 is a first yoke arm opening 442. As best seen in FIG. 5 of the disclosure, a second yoke arm opening 444 extends from a first side 446 to a second side 448 of the second yoke arm 438 of the first member 402 of the coupling assembly 400. The first yoke arm opening 442 in the first yoke arm 438 is aligned with the second yoke arm opening 444 in the second yoke arm 438 of the first member 402 of the coupling assembly 400.

As best seen in FIG. 4 of the disclosure, the second member 404 of the coupling assembly 400 has a flange portion 450 having an outer surface 452, a first end portion 454 and a second end portion 456. Extending outward from at least a portion of the outer surface 452 of the first end portion 454 of the flange portion 450 is a first yoke arm 458 of the second member 404. A first yoke arm opening 460 extends from a first side 462 to a second side 464 of the first yoke arm of the second member 404 of the coupling assembly 400. It is within the scope of this disclosure and as a non-limiting example that the second member 404 of the coupling assembly 400 may be an end yoke.

Extending outward from at least a portion of the outer surface 452 of the first end portion 454 of the flange portion 450 of the second member 404 is a second yoke arm 466. A second yoke arm opening 468 extends from a first side 470 to a second side 472 of the second yoke arm 466 of the second member 404 of the coupling assembly 400. The first yoke arm opening 460 in the first yoke arm 450 of the second member 404 of the coupling assembly 400 is aligned with the second yoke arm opening 468 in the second yoke arm 466 of the second member 404.

Drivingly connecting the first member 402 to the second member 404 of the coupling assembly 400 is the one or more third members 406. As best seen in FIG. 6 of the disclosure, the one or more third members 406 of the coupling assembly 400 has a body portion 474 with a plurality of trunnions 480 extending outward from at least a portion of an outer surface 478 of the body portion 474 of the one or more third members 406 of the coupling assembly 400. In accordance with the embodiment illustrated in FIG. 6 and as a non-limiting example, the plurality of trunnions 480 of the one or more third members 406 of the coupling assembly 400 are disposed equidistantly along the outer surface 478 of the body portion 474 of the one or more third members 406. It is within the scope of this disclosure and as a non-limiting example, that the one or more third members 406 of the coupling assembly 400 may be a journal cross.

As best seen in FIG. 6 of the disclosure and as a non-limiting example, the third member may further include the use of a plurality of bearing cap assemblies 482 that are rotatively connected to at least a portion of the outer surface 478 of the plurality of trunnions 480 of the one or more third members 406 of the coupling assembly 400. In accordance with an embodiment of the disclosure and as a non-limiting example, the plurality of bearing cap assemblies 482 include a bearing cap 484 having a plurality of bearings (not shown) connected to at least a portion of an inner surface (not shown) of the bearing cap 484 of the plurality of bearing cap assemblies 482. The first and second yoke arm openings 442 and 444 of the first member 402 of and the first and second yoke arm openings 460 and 468 of the second member 404 have a size and shape to receive and/or retain at least a portion of the plurality of trunnions 480 and/or at least a portion of the plurality of bearing cap assemblies 482 of the one or more third members 406 of the coupling assembly 400.

The first end portion 454 of the flange portion 450 of the second member 404 of the coupling assembly 400 includes one or more seating portions 486. As best seen in FIG. 8 of the disclosure and as a non-limiting example, the one or more seating portions 486 extend along at least a portion of the outer surface 452 of the first end portion 454 of the flange portion 450 of the second member 404 at an angle θ2 relative to a radial center-line C2 of the coupling assembly 400. It is within the scope of this disclosure and as a non-limiting example that the one or more seating portions 486 of the second member 404 of the coupling assembly 400 may have a size and shape to receive and/or retain at least a portion of a head portion 488 of one or more mechanical fasteners 490 of the coupling assembly 400. The one or more seating portions 486 of the first end portion 454 of the flange portion 450 of the second member 404 of the coupling assembly 400 provides the head 488 of the one or more mechanical fasteners 490 a seating surface for when the one or more mechanical fasteners 490 are tightened.

Extending from the first end portion 454 to the second end portion 456 of the flange portion 450 of the second member 404 of the coupling assembly 400 is one or more flange portion attachment apertures 492. The one or more flange portion attachment apertures 492 have a size and shape to receive and/or retain at least a portion of a shaft portion 494 of the one or more mechanical fasteners 490 extending from an end of the head portion 488 of the one or more mechanical fasteners 490. According to an embodiment of the disclosure and as a non-limiting example, at least a portion of a surface 493 defining the one or more flange portion attachment apertures 492 may be substantially smooth allowing at least a portion of the shaft portion 494 of the one or more mechanical fasteners 490 to be received within the one or more flange portion attachment apertures 492. In accordance with an alternative embodiment of the disclosure and as a non-limiting example, the surface 493 defining the one or more flange portion attachment apertures 492 may include one or more threads (not shown) that are complementary to and meshingly engaged with one or more threads 495 circumferentially extending along at least a portion of the shaft portion 494 of the one or more mechanical fasteners 490. As a result, at least a portion of the one or more mechanical fasteners 490 may be received and/or retained within at least a portion of the one or more flange portion attachment apertures 492 in the flange portion 450 of the second member 404 of the coupling assembly 400.

According to the embodiment of the disclosure illustrated in FIGS. 4-8 and as a non-limiting example, at least a portion of the one or more flange portion attachment apertures 492 of the second member 404 of the coupling assembly 400 extend from the one or more seating portions 486 extending along at least a portion of the first end portion 454 of the flange portion 450 of the second member 404. As a result, it is within the scope of this disclosure and as a non-limiting example that the number of the one or more flange portion attachment apertures 492 is equal to the number of the one or more seating portions 486 on the flange portion 450 of the second member 404 of the coupling assembly 400.

Integrally connected to at least a portion of the second end portion 456 of the flange portion 450 of the second member 404 of the coupling assembly 400 is a second shaft 496 having an outer surface 498, a first end portion 500 and a second end portion (not shown). It is within the scope of this disclosure and as a non-limiting example that the second shaft 496 may be a front axle system input shaft, a rear axle system input shaft, a forward tandem axle system input shaft, a rear tandem axle system input shaft, a differential input shaft, front axle differential input shaft, a rear axle differential input shaft, an inter-axle differential input shaft, a rear tandem axle differential input shaft, a stub shaft, a coupling shaft and/or a pinion shaft.

Circumferentially extending from at least a portion of the outer surface 498 of the first end portion 490 of the second shaft 496 is an increased diameter portion 502 having a first end portion 504 and a second end portion 506. As best seen in FIG. 4 of the disclosure, when assembled, at least a portion of the first end portion 504 of the increased diameter portion 502 of the second shaft 496 is in direct contact with at least a portion of the second end portion 456 of the flange portion 450 of the second member 404 of the coupling assembly 400. It is within the scope of this disclosure and as a non-limiting example that the increased diameter portion 502 may be integrally formed as part of the second shaft 496 or integrally connected to at least a portion of the first end portion 500 of the second shaft 496 by using one or more mechanical fasteners, one or more adhesives, one or more welds, a splined connection and/or a threaded connection. Additionally, it is within the scope of this disclosure and as a non-limiting example that the increased diameter portion 502 of the second shaft 496 may be a companion flange.

Extending outward from at least a portion of the outer surface 498 of the first end portion 504 of the increased diameter portion 502 of the second shaft 496 is an axially extending portion 508. As best seen in FIG. 4 of the disclosure and as a non-limiting example, the axially extending portion 508 of the increased diameter portion 502 of the second shaft 496 is complementary to and meshingly engaged with a recessed portion 510 extending inward from at least a portion of the second end portion 456 of the flange portion 450 of the second member 404. It is within the scope of this disclosure that the recessed portion 510 and the axially extending portion 508 of the coupling assembly 400 aid in ensuring that the second shaft 496 is properly assembled in relation to the second member 404 of the coupling assembly 400. Additionally, it is within the scope of this disclosure that the axially extending portion 508 and the recessed portion 510 may aid in reducing the overall amount of force exerted onto the one or more mechanical fasteners 490 when in operation thereby increasing the overall life and durability of the coupling assembly 400.

One or more increased diameter portion attachment apertures 512 extend from the first end portion 504 to the second end portion 506 of the increased diameter portion 502 of the second shaft 496. The one or more increased diameter portion attachment apertures 512 in the increased diameter portion 502 of the second shaft 496 are complementary to and aligned with the one or more flange portion attachment apertures 492 in the flange portion 450 of the second member 404 of the coupling assembly 400. As best seen in FIG. 4 of the disclosure, the one or more increased diameter portion attachment apertures 512 of the increased diameter portion 502 are of a size and shape to receive and/or retain at least a portion of the shaft portion 494 of the one or more mechanical fasteners 490. According to an embodiment of the disclosure and as a non-limiting example, at least a portion of a surface 514 defining the one or more increased diameter portion attachment apertures 512 are substantially smooth allowing at least a portion of the one or more mechanical fasteners 490 to be received within the one or more increased diameter portion attachment apertures 512. As a result, according to this embodiment of the disclosure and as a non-limiting example, the coupling assembly 400 may further include the use of a nut (not shown) that is meshingly engaged to the one or more mechanical fasteners 490 in order to tighten the second member 404 to the second shaft 496 of the coupling assembly 400.

In accordance with an alternative embodiment of the disclosure and as a non-limiting example, the surface 514 defining the one or more increased diameter portion attachment apertures 512 may include one or more threads (not shown) that are complementary to and meshingly engaged with the one or more threads 495 on the shaft portion 494 of the one or more mechanical fasteners 490. As a result, at least a portion of the one or more mechanical fasteners 490 may be received and/or retained within at least a portion of the one or more increased diameter portion attachment apertures 512 in the increased diameter portion 502 of the second shaft 496 of the coupling assembly 400.

According to the embodiment of the disclosure illustrated in FIG. 7 and as a non-limiting example, the one more flange portion attachment apertures 492 of the second member 404 and the one or more increased diameter portion attachment apertures 512 of the second shaft 496 may be disposed along one or more dimeters D2 from the center point CP1 of the coupling assembly 400. In accordance with the embodiment of the disclosure illustrated in FIG. 7 and as a non-limiting example, one or more of the one or more flange portion attachment apertures 492 and the one or more increased diameter portion attachment apertures 512 are disposed along an angle θ3 from the radial center-line C2 of the universal joint assembly 400. As a non-limiting example, the angle θ3 may be approximately 20° to approximately 65°.

As best seen in FIG. 8 of the disclosure and as a non-limiting example, the one or more mechanical fasteners 490, the one more flange portion attachment apertures 492 of the second member 404 and/or the one or more increased diameter portion attachment apertures 512 of the second shaft 496 may have a center-line C3 that is disposed at an angle θ4 relative to the axial center-line C1 of the coupling assembly 400. By placing the one or more mechanical fasteners 490, the one more flange portion attachment apertures 492 and/or the one or more increased diameter portion attachment apertures 512 at the angle θ4, it provides standard installation and/or removal tools 516 with the clearance needed to assemble and/or disassemble of the coupling assembly 400. As a result, the coupling assembly 400 may be indexed, assembled, disassembled, installed and/or removed without the use of specialized tools that needs to be intricately designed, machined and/or manufactured. It is within the scope of this disclosure and as a non-limiting example, that the θ1 of the tapered portion 428 of the first member 402 may additionally aid in providing the clearance needed to use the standard installation and/or removal tools 516 to assemble and/or disassemble the coupling assembly 400. In accordance with an embodiment of the disclosure and as a non-limiting example, the angles θ1, θ2 and/or θ4 may be substantially equal to one another. It is within the scope of this disclosure and as a non-limiting example, the angles θ1, θ2 and/or θ4 may be from approximately 6° to approximately 24°.

It is within the scope of this disclosure and as a non-limiting example that the one or more flange portion attachment apertures 492 in the second member 404 may be cast as part of the second member 404, drilled into the second member 404 and/or machined into the second member 404 of the coupling assembly 400. Additionally, it is within the scope of this disclosure and as a non-limiting example that the one or more increased diameter portion attachment apertures 512 in the second shaft 496 may be cast as part of the second shaft 496, drilled into the increased diameter portion 502 of the second shaft 496 and/or may be machined into the increased diameter portion 502 of the second shaft 496 of the coupling assembly 400.

Figure 9:
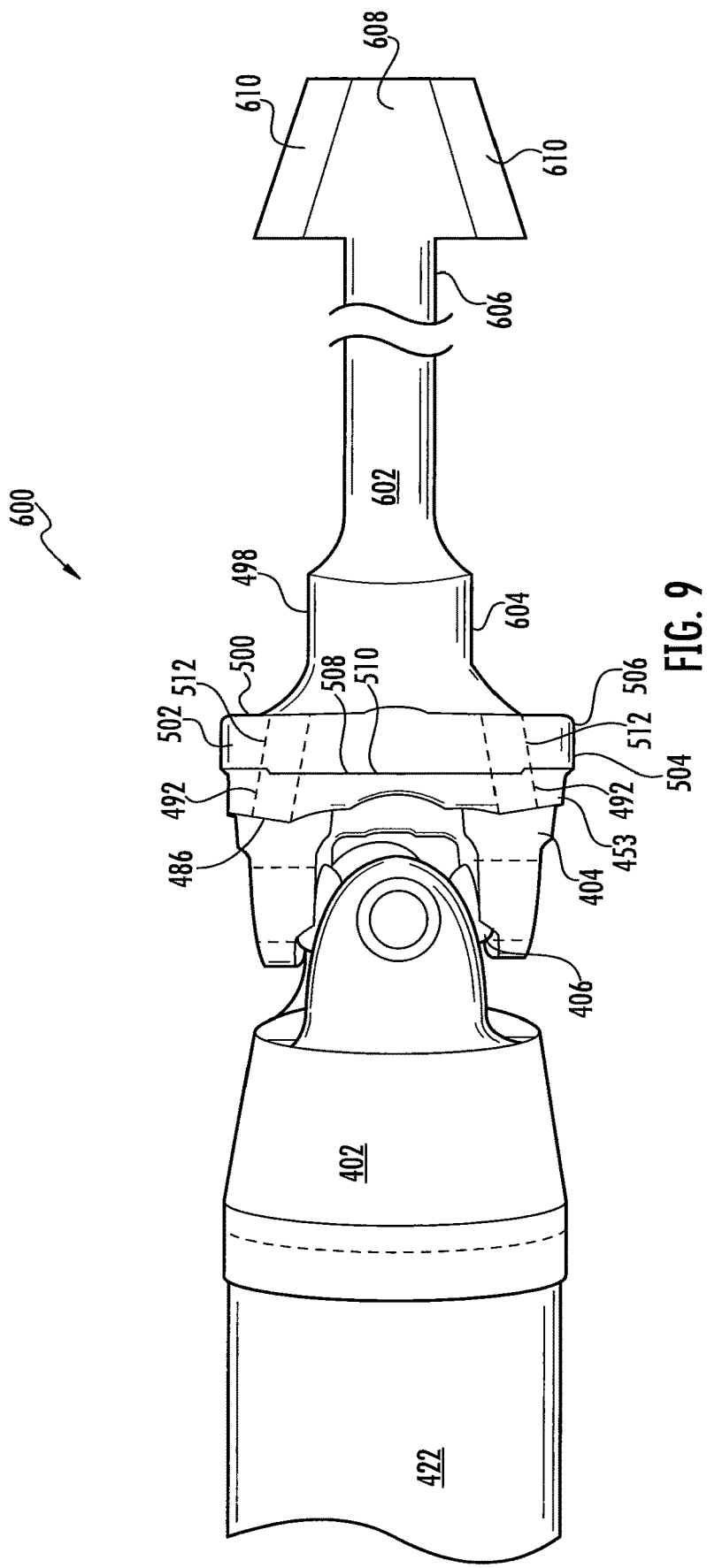
FIG. 9 is a schematic side-view of a coupling assembly having a second shaft according to an alternative embodiment of the disclosure.

FIG. 9 is a schematic side-view of a coupling assembly 600 having a second shaft 602 according to an alternative embodiment of the disclosure. The coupling assembly 600 illustrated in FIG. 9 is the same as the coupling assembly 400 illustrated in FIGS. 4-8, except where specifically noted below. Additionally, the second shaft 602 of the coupling assembly 600 is the same as the second shaft 496 of the coupling assembly 400, except where specifically noted below. In accordance with the embodiment of the disclosure illustrated in FIG. 9 and as a non-limiting example, the second shaft 602 further includes a second increased diameter portion 604 circumferentially extending from at least a portion of the outer surface 498 of the first end portion 500 of the second shaft 602. At least a portion of the second increased diameter portion 604 on the first end portion 500 of the second shaft 602 is disposed directly adjacent to at least a portion of the second end portion 506 of the increased diameter portion 502 of the second shaft 602.

Connected to at least a portion of the outer surface 498 a second end portion 606 of the second shaft 602 is a pinion gear 608. Circumferentially extending along at least a portion of the outer surface 498 of the pinion gear 608 is a plurality of pinion gear teeth 610. It is within the scope of this disclosure and as a non-limiting example that the pinion gear 608 of the coupling assembly 600 may be integrally formed as part of the second end portion 606 of the second shaft 602 or may be integrally connected to at least a portion of the second end portion 606 of the second shaft 602 by using one or more welds, one or more adhesives, one or more mechanical fasteners, a splined connection and/or a threaded connection. Additionally, it is within the scope of this disclosure and as a non-limiting example, that the plurality of pinion gear teeth 610 of the pinion gear 608 are complementary to and meshingly engaged with a plurality of ring gear teeth (not shown) on an outer surface (not shown) of a differential ring gear (not shown). As a non-limiting example, the second shaft 602 may be a differential pinion shaft, a front axle differential pinion shaft, a rear axle differential pinion shaft and/or a rear tandem axle differential pinion shaft.

Figure 10:
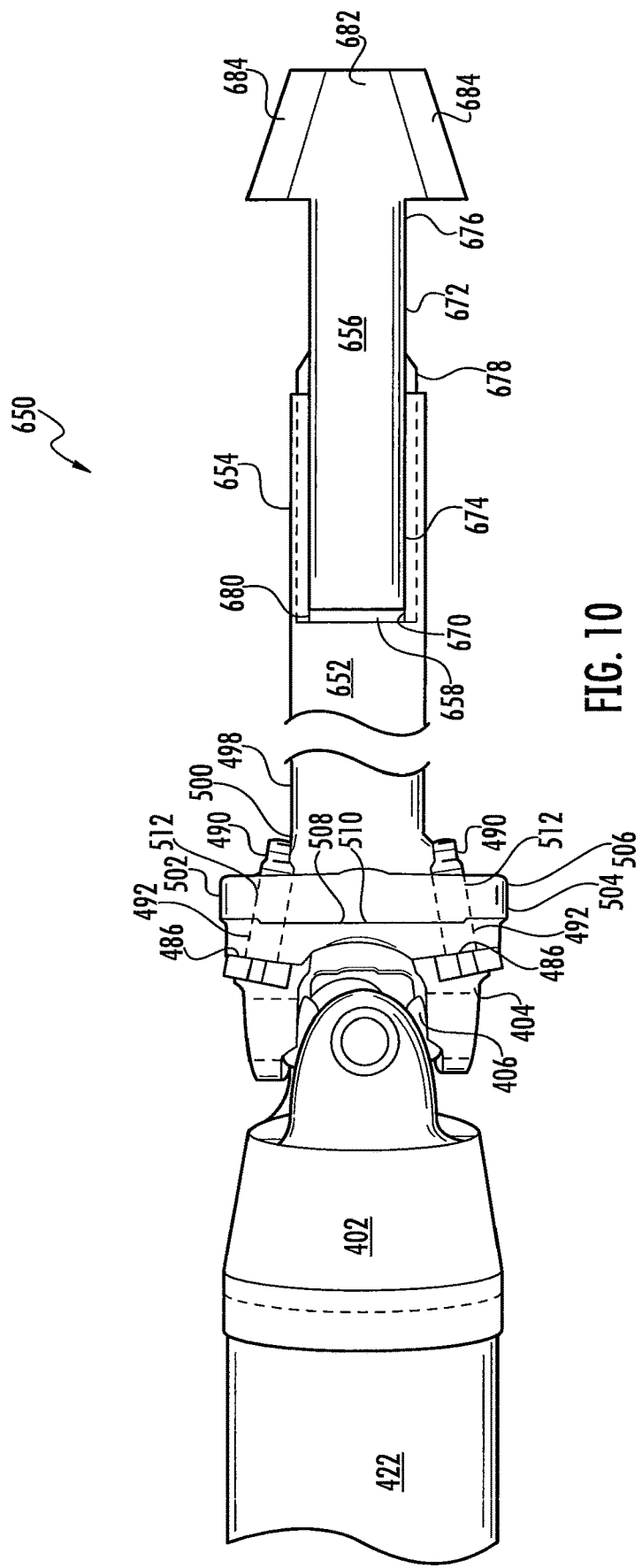
FIG. 10 is a schematic side-view of a coupling assembly having a second shaft according to another embodiment of the disclosure.

FIG. 10 is a schematic side-view of a coupling assembly 650 having a second shaft 652 according to another embodiment of the disclosure. The coupling assembly 650 illustrated in FIG. 10 is the same as the coupling assemblies 400 and 600 illustrated in FIGS. 4-9, except where specifically noted below. Additionally, the second shaft 652 of the coupling assembly 650 is the same as the second shafts 496 and 602 of the coupling assemblies 400 and 600, except where specifically noted below. In accordance with this embodiment of the disclosure, the second shaft 652 does not include the second increased diameter portion 604 as illustrated in FIG. 9 of the disclosure.

As illustrated in FIG. 10 of the disclosure and as a non-limiting example, at least a portion of a second end portion 654 of the second shaft 652 is drivingly connected to at least a portion of a third shaft 656. Extending inward from an end of the second shaft 652, opposite the increased diameter portion 502, is a hollow interior portion 658 defined by an inner surface 670. The hollow interior portion 658 of the second end portion 654 of the second shaft 652 is of a size and shape to receive and/or retain at least a portion of the third shaft 656.

The third shaft 656 has an outer surface 672, a first end portion 674 and a second end portion 676. Circumferentially extending along at least a portion of the outer surface 672 of the first end portion 674 of the third shaft 656 is a plurality of axially extending third shaft splines 678. As illustrated in FIG. 10 of the disclosure, the plurality of axially extending third shaft splines 678 are complementary to and meshingly engaged with a plurality of axially extending second shaft splines 680 circumferentially extending along at least a portion of the inner surface 670 defining the hollow interior portion 658 in at least a portion of the second end portion 654 of the second shaft 652.

Connected to at least a portion of the outer surface 627 of the second end portion 676 of the third shaft 656 is a pinion gear 682. Circumferentially extending along at least a portion of the outer surface 672 of the pinion gear 682 is a plurality of pinion gear teeth 684. It is within the scope of this disclosure and as a non-limiting example that the pinion gear 682 of the coupling assembly 650 may be integrally formed as part of the second end portion 676 of the third shaft 656 or may be integrally connected to at least a portion of the second end portion 676 of the third shaft 656 by using one or more welds, one or more adhesives, one or more mechanical fasteners, a splined connection and/or a threaded connection. Additionally, it is within the scope of this disclosure and as a non-limiting example, that the plurality of pinion gear teeth 684 of the pinion gear 682 are complementary to and meshingly engaged with a plurality of ring gear teeth (not shown) on an outer surface (not shown) of a differential ring gear (not shown). As a non-limiting example, the third shaft 656 may be differential pinion shaft, a front axle differential pinion shaft, a rear axle differential pinion shaft and/or a rear tandem axle differential pinion shaft.

Figure 11:
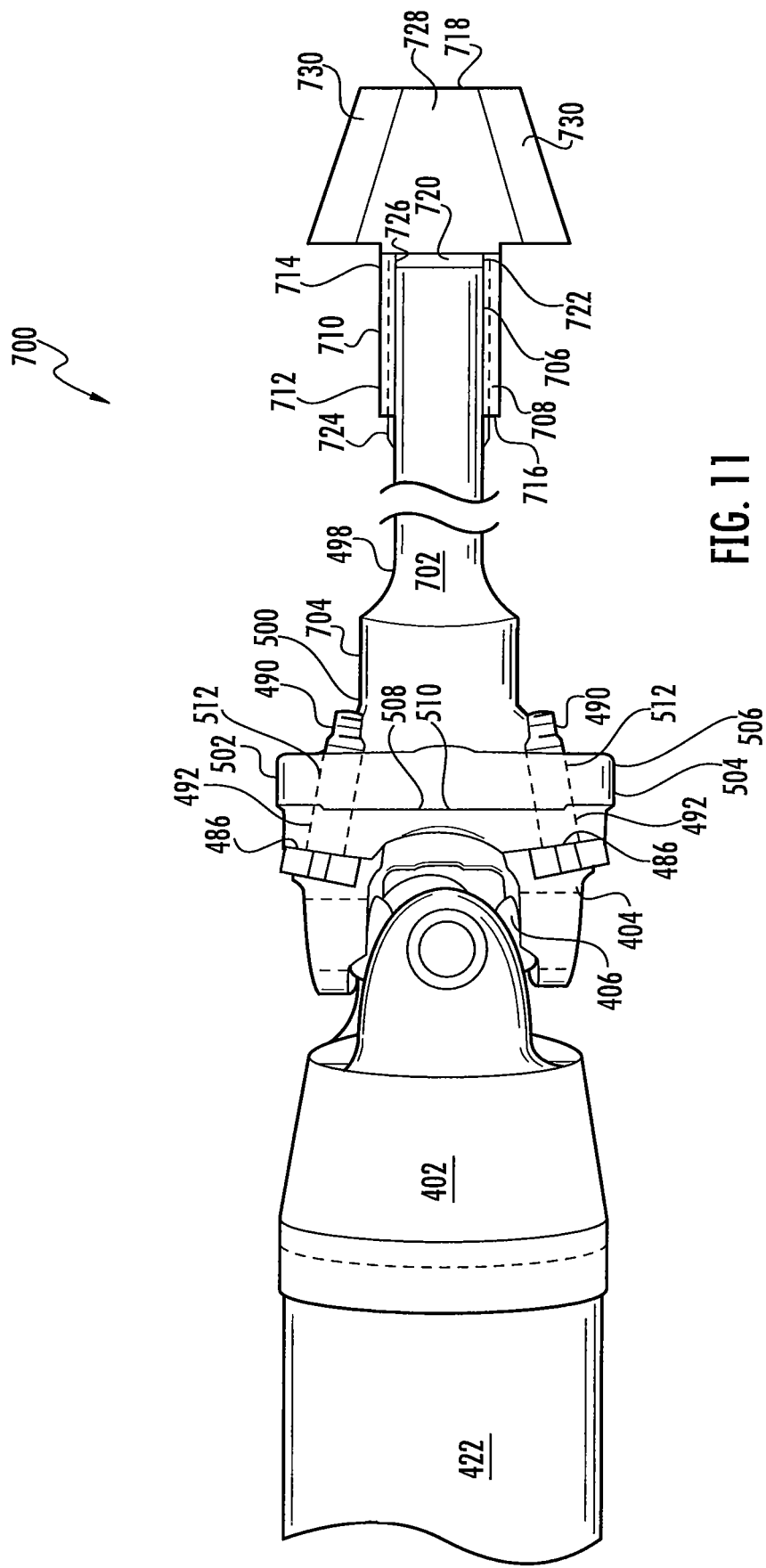
FIG. 11 is a schematic side-view of a coupling assembly having a second shaft according to yet another embodiment of the disclosure.

FIG. 11 is a schematic side-view of a coupling assembly 700 having a second shaft 702 according to yet another embodiment of the disclosure. The coupling assembly 700 illustrated in FIG. 11 is the same as the coupling assemblies 400, 600 and 650 illustrated in FIGS. 4-10, except where specifically noted below. Additionally, the second shaft 702 of the coupling assembly 700 is the same as the second shafts 496, 602 and 652 illustrated in FIGS. 4-10, except where specifically noted below. As illustrated in FIG. 11 of the disclosure and as non-limiting example, the second shaft 702 may include a second increased diameter portion 704 circumferentially extending from at least a portion of the outer surface 498 of the first end portion 500 of the second shaft 702. In accordance with the embodiment of the disclosure illustrated in FIG. 11 and as a non-limiting example, the second increased diameter portion 704 of the second shaft 702 is disposed directly adjacent to at least a portion of the second end portion 506 of the increased diameter portion 502 of the second shaft 702.

Drivingly connected to at least a portion of a second end portion 706 of the second shaft 702 is a third shaft 708 having an outer surface 710, a first end portion 712, a second end portion 714, a first end 716 and a second end 718. Extending inward from at least a portion of the first end 716 of the third shaft 708 is a hollow interior portion 720 that is defined by an interior surface 722. Circumferentially extending along at least a portion of the inner surface 722 defining the hollow interior portion 720 in at least a portion of the first end portion 712 of the third shaft 708 is a plurality of axially extending third shaft splines 724. The plurality of axially extending third shaft splines 724 are complementary to and meshingly engaged with a plurality of axially extending second shaft splines 726 circumferentially extending from at least a portion of the second end portion 706 of the second shaft 702. As a result, the hollow interior portion 720 of the third shaft 708 is of a size and shape to receive and/or retain at least a portion of the second end portion 706 of the second shaft 704 of the coupling assembly 700.

Connected to at least a portion of the second end portion 714 of the third shaft 708 is a pinion gear 728. Circumferentially extending from art least a portion of the outer surface 710 of the pinion gear 728 is a plurality of pinion gear teeth 730. It is within the scope of this disclosure and as a non-limiting example that the pinion gear 728 of the coupling assembly 700 may be integrally formed as part of the second end portion 714 of the third shaft 708 or may be integrally connected to at least a portion of the second end portion 714 of the third shaft 708 by using one or more welds, one or more adhesives, one or more mechanical fasteners, a splined connection and/or a threaded connection. Additionally, it is within the scope of this disclosure and as a non-limiting example, that the plurality of pinion gear teeth 730 of the pinion gear 728 are complementary to and meshingly engaged with a plurality of ring gear teeth (not shown) on an outer surface (not shown) of a differential ring gear (not shown). As a non-limiting example, the third shaft 708 may be differential pinion shaft, a front axle differential pinion shaft, a rear axle differential pinion shaft and/or a rear tandem axle differential pinion shaft.

Figure 12:
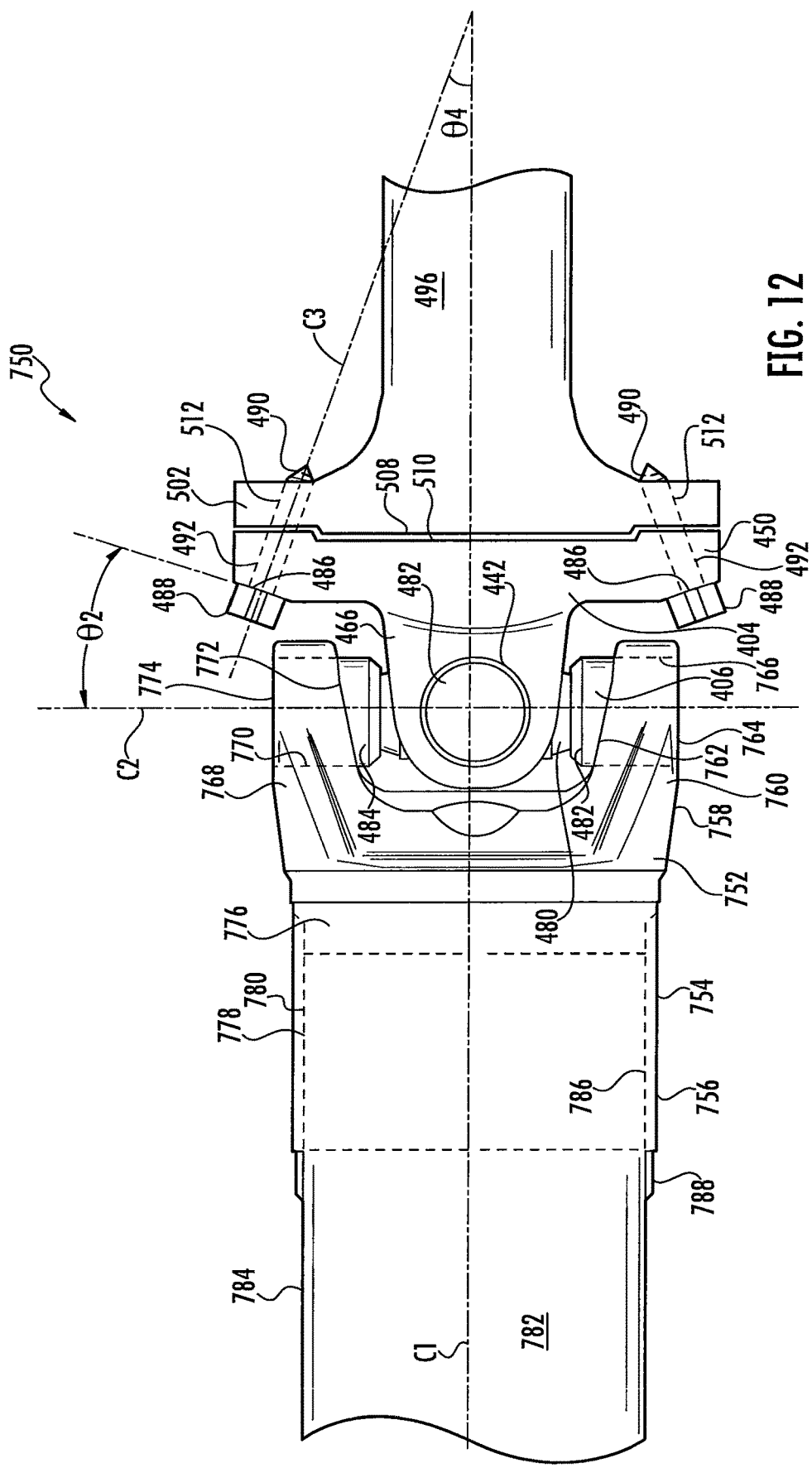
FIG. 12 is a schematic side-view of a coupling assembly having a first member according to an alternative embodiment of the disclosure.

FIG. 12 is a schematic side-view of a coupling assembly 750 having a first member 752 according to an alternative embodiment of the disclosure. The coupling assembly 750 illustrated in FIG. 12 is the same as the coupling assemblies 400, 600, 650 and 700 illustrated in FIGS. 4-11, except where specifically noted below. Additionally, the first member 752 of the coupling assembly 750 is the same as the first member 402 of the coupling assemblies 400, 600, 650 and 700 illustrated in FIGS. 4-11, except where specifically noted below. As illustrated in FIG. 12 and as a non-limiting example, the first member 752 of the coupling assembly 750 has an outer surface 754, a first end portion 756 and a second end portion 758.

Extending outward from at least a portion of the outer surface 754 of the second end portion 758 of the first member 752 of the coupling assembly 750 is a first yoke arm 760 having a first side 762 and a second side 764. Extending from the first side 762 to the second side 764 of the first yoke arm 760 of the first member 752 of the coupling assembly 750 is a first yoke arm opening 766. The first yoke arm opening 766 of the first yoke arm 760 of the first member 752 is of a size and shape to receive and/or retain at least a portion of the plurality of trunnions 480 and/or the plurality bearing cap assemblies 482 of the one or more third members 406 of the coupling assembly 750.

A second yoke arm 768 extends outward from at least a portion of the outer surface 754 of the second end portion 758 of the first member 752 of the coupling assembly 750. As illustrated in FIG. 12, the second yoke arm 768 has a second yoke arm 770 opening extending from a first side 772 to a second side 774 of the second yoke arm 768 of the first member 752. The second yoke arm opening 770 of the second yoke arm 768 of the first member 752 is of a size and shape to receive and/or retain at least a portion of the plurality of trunnions 480 and/or the plurality bearing cap assemblies 482 of the one or more third members 406 of the coupling assembly 750. In accordance with the embodiment of the disclosure illustrated in FIG. 12 and as a non-limiting example, the first yoke arm opening 766 and the second yoke arm opening 770 of the first member 752 of the coupling assembly 750 are aligned with one another.

Extending inward from an end of the first member 752 of the coupling assembly 750 is a hollow interior portion 776 that is defined by an inner surface 778. Circumferentially extending along at least a portion of the inner surface 778 of the hollow interior portion 776 in at least a portion of the first end portion 756 of the first member 752 is a plurality of axially extending first member splines 780. The hollow interior portion 776 in at least a portion of the first end portion 756 of the first member 752 of the coupling assembly 750 is of a size and shape to receive and/or retain at least a portion of a first shaft 782.

As illustrated in FIG. 12 of the disclosure and as a non-limiting example, the first shaft 782 is drivingly connected to at least a portion of the first end portion 756 of the first member 752 of the coupling assembly 750. It is within the scope of this disclosure and as a non-limiting example that at least a portion of the second end portion 786 of the first shaft 782 may be connected to at least a portion of the first end portion 756 of the first member 752 of the coupling assembly 750 by using one or more welds, one or more mechanical fasteners, one or more adhesives, a splined connection and/or a threaded connection. As a non-limiting example, the first shaft 782 may be a drive-shaft, a driving shaft, a propeller shaft, a prop shaft a Cardan shaft and/or a double Cardan shaft.

According to the embodiment of the disclosure illustrated in FIG. 12 and as a non-limiting example, the first shaft 782 has an outer surface 784, a first end portion (not shown) and a second end portion 786. In accordance with the embodiment of the disclosure illustrated in FIG. 12 and as a non-limiting example, a plurality of axially extending first shaft splines 788 circumferentially extend along at least a portion of the outer surface 784 of the second end portion 786 of the first shaft 782. The plurality of axially extending first shaft splines 788 of the first shaft 782 are complementary to and meshingly engaged with the plurality of axially extending first member splines 780 of the first member 752.

Figure 13:
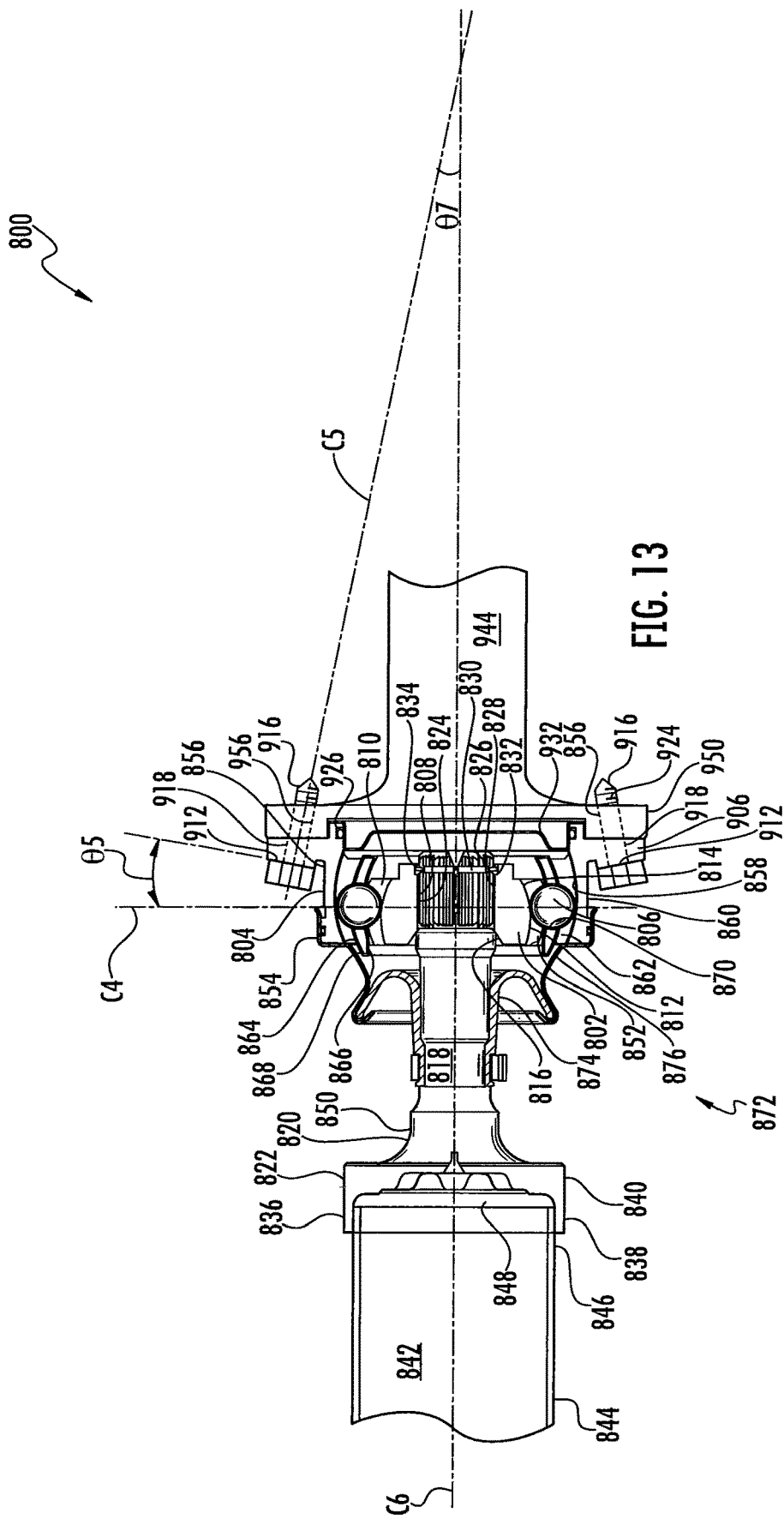
FIG. 13 is a cut-away schematic side-view of a coupling assembly according to an alternative embodiment of the disclosure.
Figure 14:
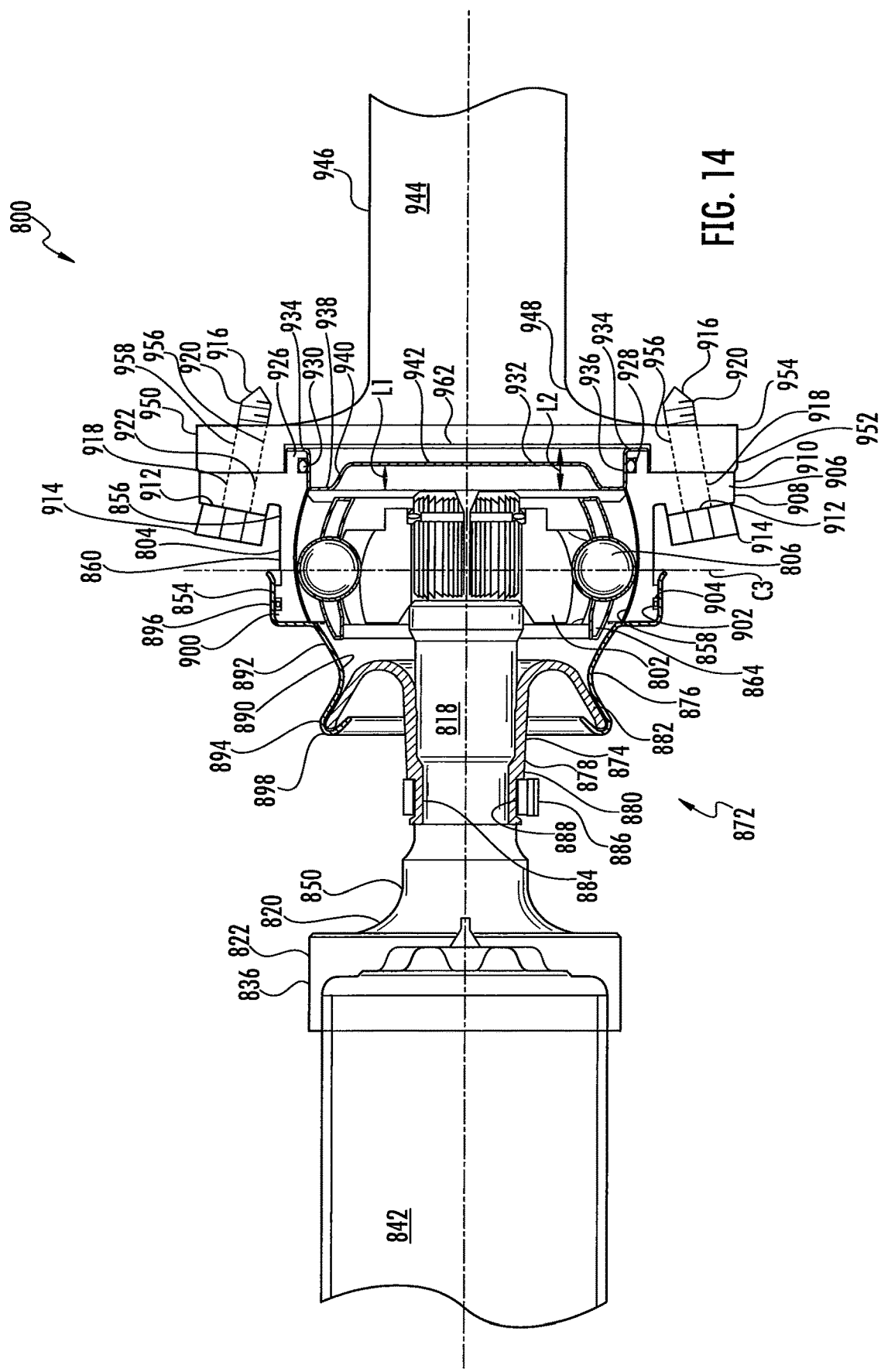
FIG. 14 is a cut-away schematic side-view of the coupling assembly according to the embodiment of the disclosure illustrated in FIG. 13.
Figure 15:
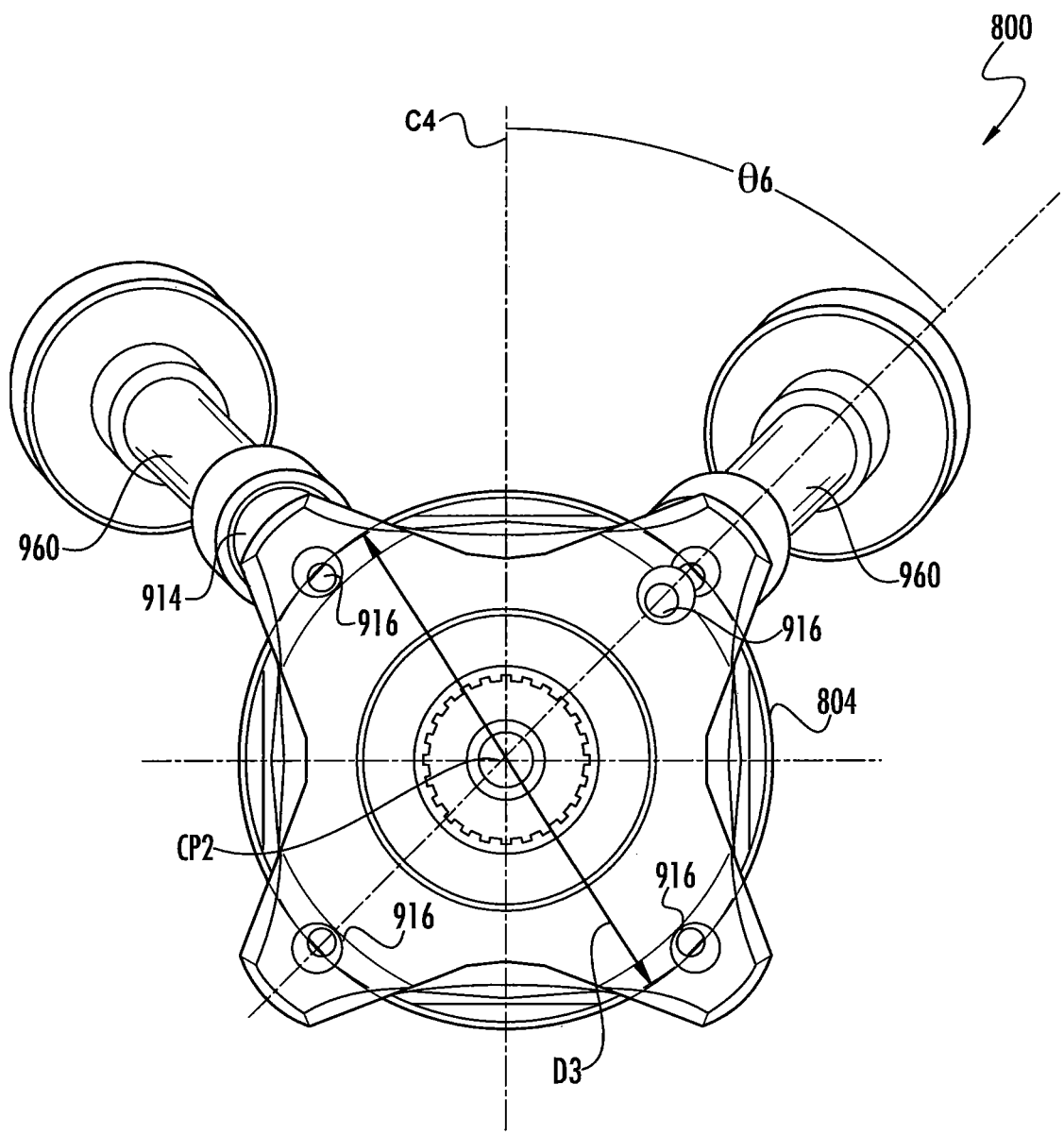
FIG. 15 is a schematic view of a portion of the coupling assembly according to the embodiment of the disclosure illustrated in FIGS. 13 and 14.

FIGS. 13-15 schematically illustrate a coupling assembly 800 according to an alternative embodiment of the disclosure. The coupling assembly 800 illustrated in FIG. 13 of the disclosure is the same as the coupling assemblies 400, 600, 650, 700 and 750 illustrated in FIGS. 4-12, except where specifically noted below. As best see in FIG. 13 of the disclosure and as a non-limiting example, the coupling assembly includes a first member 802 that is drivingly connected to a second member 804 via one or more third members 806. It is within the scope of this disclosure and as a non-limiting example that the coupling assembly 800 may be a homokinetic coupling or a constant velocity joint.

In accordance with the embodiment of the disclosure illustrated in FIG. 13 and as a non-limiting example, the first member 802 of the coupling assembly 800 has an inner surface 808, an outer surface 810, a first end portion 812 and a second end portion 814. According to the embodiment of the disclosure illustrated in FIG. 13 and as a non-limiting example, the first member 802 of the coupling assembly 800 is an inner race. At least a portion of the first end portion 812 of the first member 802 of the coupling assembly 800 is a chamfered portion 816. It is within the scope of this disclosure and as a non-limiting example, that the chamfer portion 816 of the first member 802 is a lead-in chamfer.

Drivingly connected to and extending co-axially with at least a portion of the first member 802 of the coupling assembly is a stub shaft 818 having an outer surface 820, a first end portion 822 and a second end portion 824. Circumferentially extending along at least a portion of the outer surface 820 of the second end portion 824 of the stub shaft 818 is a plurality of axially extending stub shaft splines 826. The plurality of axially extending stub shaft splines 826 are complementary to and meshingly engaged with a plurality of axially extending first member splines 828 circumferentially extending along at least a portion of the inner surface 808 of the first member 802 of the coupling assembly 800.

A stub shaft retaining member groove 830 circumferentially extends along at least a portion of the outer surface 820 of the second end portion 824 of the stub shaft 818 of the coupling assembly 800. The stub shaft retaining member groove 830 in the outer surface 820 of the second end portion 824 of the stub shaft 818 is aligned with a first member retaining member groove 832 circumferentially extending along at least a portion of the inner surface 808 of the first member 802 of the coupling assembly 800. In accordance with the embodiment of the disclosure illustrated in FIG. 13 and as a non-limiting example, at least a portion of the stub shaft snap ring groove 830 is disposed within the plurality of axially extending stub shaft splines 826 in the outer surface 820 of the second end portion 824 of the stub shaft 818. Additionally, in accordance with the embodiment of the disclosure illustrated in FIG. 13 and as a non-limiting example, at least a portion of the first member retaining member groove 832 is disposed in the inner surface 808 of the second end portion 814 of the first member 802.

Disposed within at least a portion of the first member retaining member groove 832 and the stub shaft retaining member groove 830 is one or more retaining members 834. The one or more retaining members 834 of the coupling assembly 800 is of a size and shape to be received and/or retained within at least a portion of the stub shaft retaining member groove 830 of the stub shaft 818 and the first member retaining member groove 832 of the first member 802. The one or more retaining members 834 are used in order to axially restrain the stub shaft 818 relative to the first member 802 when in operation. As a non-limiting example, the retaining member 834 is a snap-ring, a circlip, a C-Clip, a Seeger ring, or any other type of semi-flexible retaining member that is able to axially restrain one component relative to another.

Circumferentially extending from at least a portion of the outer surface 820 of the first end portion 822 of the stub shaft 818 is an increased diameter portion 836 having a first end portion 838 and a second end portion 840. According to the embodiment of the disclosure illustrated in FIG. 13 and as a non-limiting example, the increased diameter portion 836 of the stub shaft 818 of the coupling assembly 800 is substantially cylindrical in shape.

Drivingly connected to and extending co-axially with at least a portion of the increased diameter portion 836 of the stub shaft 818 is a first shaft 842 having an outer surface 844, a first end portion (not shown) and a second end portion 846. It is within the scope of this disclosure and as a non-limiting example that at least a portion of the second end portion 846 of the first shaft 842 may be connected to at least a portion of the increased diameter portion 836 of the stub shaft 818 by using one or more mechanical fasteners, one or more adhesives, one or more welds, a splined connection and/or a threaded connection. According to the embodiment of the disclosure illustrated in FIG. 13 and as a non-limiting example, at least a portion of the second end portion 846 of the first shaft 842 is received and/or retained within a hollow interior portion 848 in the increased diameter portion 836 of the stub shaft 818. As a non-limiting example, the first shaft 842 may be a drive-shaft, a driving shaft, a propeller shaft, a prop shaft a Cardan shaft and/or a double Cardan shaft.

In accordance with the embodiment of the disclosure illustrated in FIG. 13 and as a non-limiting example, the stub shaft 818 may further include a second increased diameter portion 850 circumferentially extending from at least a portion of the outer surface 820 of the first end portion 822 of the stub shaft 818. As illustrated in FIG. 13 and as a non-limiting example, at least a portion of the second increased diameter portion 850 of the stub shaft 818 is disposed directly adjacent to at least a portion of the second end portion 840 of the increased diameter portion 836 of the stub shaft 818.

Circumferentially extending along at least a portion of the outer surface 810 of the first member 802 is one or more first member grooves 852. The one or more first member grooves 852 have a size and shape that is able to receive and/or retain at least a portion of the one or more third members 806 of the coupling assembly 800. As illustrated in FIG. 13 of the disclosure and as a non-limiting example, at least a portion of one or more of the one or more third members 806 of the coupling assembly 800 are disposed within the one or more first member grooves 852 in the outer surface 810 of the first member 802 of the coupling assembly 800.

Disposed radially outboard from at least a portion of the first member 802 is the second member 804 of the coupling assembly 800. As illustrated in FIG. 13 of the disclosure and as a non-limiting example, the second member 804 of the coupling assembly 800 has a first end portion 854, a second end portion 856, an inner surface 858 and an outer surface 860. Circumferentially extending along at least a portion of the inner surface 858 of the second member 804 of the coupling assembly 800 is one or more second member grooves 862. The one or more second member grooves 862 have a size and shape to receive and/or retain at least a portion of one or more of the one or more third members 806 thereby drivingly connecting the first member 802 to the second member 804 of the coupling assembly 800. As a non-limiting example, the second member 804 of the coupling assembly 800 is an outer race. Additionally, as a non-limiting example, the one or more third members 806 are one or more torque transfer elements, one or more rolling elements and/or one or more ball bearings.

Interposed between at least a portion of the first member 802 and the second member 804 is a cage 864 having an inner surface 866 and an outer surface 868. Extending from the inner surface 866 to the outer surface 868 of the cage 864 is one or more apertures 870. As illustrated in FIG. 13 of the disclosure and as a non-limiting example, the one or more apertures 870 of the cage 864 have a size and shape to receive and/or retain at least a portion of one or more of the one or more third members 806 of the coupling assembly 800. The cage 864 of the coupling assembly 800 aids in ensuring that the one or more third members 806 remain in their ideal operating position when the coupling assembly 800 is in operation.

Disposed radially outboard from at least a portion of the stub shaft 818 of the coupling assembly 800 is a boot assembly 872 having a flexible boot 874 and/or a boot can 876. The boot assembly 872 sealingly engages at least a portion of the outer surface 820 of the stub shaft 818 and at least a portion of the outer surface 860 of the second member 804 of the coupling assembly 800. As a result, the boot assembly 872 aids in preventing the migration of dirt, debris and/or moisture into the coupling assembly 800 thereby increasing the overall life and durability of the coupling assembly 800. Additionally, the boot assembly 872 aids in preventing the migration of a lubrication fluid (not shown) from within the coupling assembly 800 thereby further aiding in increasing the overall life and durability of the coupling assembly 800.

As best seen in FIG. 14 of the disclosure and as a non-limiting example, the flexible boot 874 of the boot assembly 872 has an outer surface 878, a first end portion 880 and a second end portion 882. The flexible boot 874 allows the first shaft 842 and/or the stub shaft 818 to move relative to the second member 804 of the cooping assembly 800 while still sealing the coupling assembly 800 from the environment. According to the embodiment of the disclosure illustrated in FIG. 14 and as a non-limiting example, at least a portion of the first end portion 880 of the flexible boot 874 is sealingly engaged with at least a portion of the outer surface 820 of the stub shaft 818 of the coupling assembly 800.

In accordance with the embodiment of the disclosure illustrated in FIG. 14 and as a non-limiting example, at least a portion of the first end portion 880 of the flexible boot 874 may be received and/or retained within a boot groove 884 circumferentially extending along at least a portion of the outer surface 820 of the stub shaft 818. As illustrated in FIG. 14 and as a non-limiting example, the boot groove 884 is disposed directly adjacent to an end of the second increased diameter portion 850 opposite the increased diameter portion 836 of the stub shaft 818. The boot groove 884 of the stub shaft 818 aids in ensuring that the flexible boot 874 of the boot assembly 872 sealingly engages at least a portion of the outer surface 820 of the stub shaft 818 of the coupling assembly 800.

It is within the scope of this disclosure and as a non-limiting example that the first end portion 880 of the flexible boot 874 may be secured to the outer surface 820 of the stub shaft 818 by using one or more clamping members 886. According to the embodiment of the disclosure illustrated in FIG. 14 and as a non-limiting example, at least a portion of the one or more clamping members 886 of the boot assembly 872 may be received and/or retained within a clamping member groove 888 circumferentially extending along at least a portion of the outer surface 878 of the flexible boot 874.

As best seen in FIG. 14 of the disclosure, the boot can 876 of the boot assembly 872 of the coupling assembly 800 has an inner surface 890, an outer surface 892, a first end portion 894 and a second end portion 896. The boot can 876 of the boot assembly 872 aids in preventing road debris from contacting and damaging the flexible boot 874 when in operation thereby aiding in increasing the overall life and durability of the coupling assembly 800. At least a portion of the first end portion 894 of the boot can 876 is sealingly engaged with at least a portion of the second end portion 882 of the flexible boot 874. In accordance with the embodiment of the disclosure illustrated in FIG. 14 and as a non-limiting example, the first end portion 894 of the boot can 876 may be sealingly engaged with the second end portion 882 of the flexible boot 874 by clamping at least a portion of the first end portion 894 of the boot can 876 around at least a portion of the second end portion 882 of the flexible boot 874. As a result, the first end portion 894 of the boot can 876 may include a hook shaped portion 898. It is within the scope of this disclosure that one or more adhesives may also be used in order aid in ensuring the second end portion 882 of the flexible boot 874 is sealingly engaged with the first end portion 894 of the boot can 876.

At least portion of the second end portion 896 of the boot can 876 of the boot assembly 872 is sealingly engaged with at least a portion of the outer surface 860 of the first end portion 854 of the second member 804 of the coupling assembly 800. As best seen in FIG. 14 of the disclosure, at least a portion of the second end portion 896 of the boot can 876 is in direct contact with and is sealingly engaged with at least a portion of an increased diameter portion 900 circumferentially extending from at least a portion of the outer surface 860 of the first end portion 854 of the second member 804 of the coupling assembly 800.

In order to aid in ensuring that the second end portion 896 o the boot can 874 is sealingly engaged with the outer surface 860 of the first end portion 854 of the second member 804, one or more first O-rings 902 may be received within at least a portion of a first O-ring groove 904. The first O-ring groove 904 circumferentially extends from at least a portion of the outer surface 860 of the first end portion 854 of the second member 804. As best seen in FIG. 14 and as a non-limiting example, at least a portion of the first O-ring groove 904 may be disposed within the outer surface 860 of the increased diameter portion 900 of the first end portion 854 of the second member 804.

Circumferentially extending from at least a portion of the outer surface 860 of the second end portion 856 of the second member 804 is a flange portion 906 having a first end portion 908 and a second end portion 910. As best seen in FIG. 14 of the disclosure, the first end portion 908 of the flange portion 906 of the second member 804 includes one or more seating portions 912. As best seen in FIG. 13 of the disclosure and as a non-limiting example, the one or more seating portions 912 extend along at least a portion of the outer surface 860 of the first end portion 908 of the flange portion 906 of the second member 804 at an angle θ5 relative to a radial center-line C4 of the coupling assembly 800. It is within the scope of this disclosure and as a non-limiting example that the one or more seating portions 912 of the second member 804 of the coupling assembly 800 may have a size and shape to receive and/or retain at least a portion of a head portion 914 of one or more mechanical fasteners 916 of the coupling assembly 800. The one or more seating portions 912 of the first end portion 908 of the flange portion 906 of the second member 804 of the coupling assembly 800 provides the head 914 of the one or more mechanical fasteners 916 a seating surface for when the one or more mechanical fasteners 916 are tightened.

Extending from the first end portion 908 to the second end portion 910 of the flange portion 906 of the second member 804 of the coupling assembly 800 is one or more flange portion attachment apertures 918. The one or more flange portion attachment apertures 918 have a size and shape to receive and/or retain at least a portion of a shaft portion 920 of the one or more mechanical fasteners 916 extending from an end of the head portion 914 of the one or more mechanical fasteners 916. According to an embodiment of the disclosure and as a non-limiting example, at least a portion of a surface 922 defining the one or more flange portion attachment apertures 918 may be substantially smooth allowing at least a portion of the shaft portion 920 of the one or more mechanical fasteners 916 to be received within the one or more flange portion attachment apertures 918. In accordance with an alternative embodiment of the disclosure and as a non-limiting example, the surface 922 defining the one or more flange portion attachment apertures 918 may include one or more threads (not shown) that are complementary to and meshingly engaged with one or more threads 924 circumferentially extending along at least a portion of the shaft portion 920 of the one or more mechanical fasteners 916. As a result, at least a portion of the one or more mechanical fasteners 916 may be received and/or retained within at least a portion of the one or more flange portion attachment apertures 918 in the flange portion 906 of the second member 804 of the coupling assembly 800.

According to the embodiment of the disclosure illustrated in FIGS. 13 and 14 and as a non-limiting example, at least a portion of the one or more flange portion attachment apertures 918 of the second member 804 of the coupling assembly 800 extend from the one or more seating portions 912 extending along at least a portion of the first end portion 908 of the flange portion 906 of the second member 804. As a result, it is within the scope of this disclosure and as a non-limiting example that the number of the one or more flange portion attachment apertures 918 is equal to the number of the one or more seating portions 912 on the flange portion 906 of the second member 804 of the coupling assembly 800.

Extending outboard from at least a portion of the second end portion 910 of the flange portion 906 of the second member 804 is an axially extending portion 926. As best seen in FIG. 14 of the disclosure and as a non-limiting example, at least a portion of the axially extending portion 926 of the second member 804 is disposed radially inward from at least a portion of the one or more attachment apertures 918 in the flange portion 906 of the second member 804. Circumferentially extending along at least a portion of the inner surface 858 of the axially extending portion 926 of the second end portion 856 of the second member 804 is a second O-ring groove 928. As best seen in FIG. 14 of the disclosure, the second O-ring groove 928 has a size and shape to receive and/or retain at least a portion of one or more second O-rings 930 therein.

Sealingly connected to at least a portion of the axially extending portion 926 of the second end portion 856 of the second member 804 is a grease cap 932. The grease cap 936 aids sealing the coupling assembly 800 and ensuring that the lubrication fluid (not shown) within the coupling assembly 800 does not migrate out of the coupling assembly 800. As best seen in FIG. 14 of the disclosure and as a non-limiting example, the grease cap 932 includes a radially outward extending lip 934, an axially inward extending portion 936, a radially inward extending portion 938, an arcuate portion 940 and a radially extending portion 942. In accordance with the embodiment of the disclosure illustrated in FIG. 14 and as a non-limiting example, at least a portion of the axially inward extending portion 936 of the grease cap 932 is sealingly engaged with and is in direct contact with at least a portion of the inner surface 858 of the second member 804, the inner surface 804 of the axially extending portion 926 and/or the one or more second O-rings 930. Additionally, in accordance with the embodiment of the disclosure illustrated in FIG. 14 of the disclosure, at least a portion of the axially inward extending portion 936 and radially outward extending lip 934 of the grease cap 932 is in direct contact with and sealingly engaged with the axially extending portion 926 of the second member 804.

As best seen in FIG. 14 of the disclosure and as a non-limiting example, the grease cap 932 has a length L1 extending from the radially inward extending portion 938 to the radially extending portion 942 of the grease cap 932. Additionally, as best seen in FIG. 14 of the disclosure and as a non-limiting example, the grease cap 932 has a length L2 extending from the radially inward extending portion 938 to the radially outward extending lip 934 of the grease cap 932. In accordance with an embodiment of the disclosure and as a non-limiting example, the length L1 of the grease cap 932 is less than the length L2 of the grease cap 932.

Integrally connected to at least a portion of the second end portion 910 of the flange portion 906 of the second member 804 of the coupling assembly 800 is a second shaft 944 having an outer surface 946, a first end portion 948 and a second end portion (not shown). It is within the scope of this disclosure and as a non-limiting example that the second shaft 944 may be a front axle system input shaft, a rear axle system input shaft, a forward tandem axle system input shaft, a rear tandem axle system input shaft, a differential input shaft, front axle differential input shaft, a rear axle differential input shaft, an inter-axle differential input shaft, a rear tandem axle differential input shaft, a stub shaft, a coupling shaft and/or a pinion shaft.

Circumferentially extending from at least a portion of the outer surface 946 of the first end portion 940 of the second shaft 944 is an increased diameter portion 950 having a first end portion 952 and a second end portion 954. As best seen in FIG. 14 of the disclosure, when assembled, at least a portion of the first end portion 952 of the increased diameter portion 950 of the second shaft 944 is in direct contact with at least a portion of the second end portion 910 of the flange portion 906 of the second member 804 of the coupling assembly 800. It is within the scope of this disclosure and as a non-limiting example that the increased diameter portion 950 may be integrally formed as part of the second shaft 944 or integrally connected to at least a portion of the first end portion 948 of the second shaft 944 by using one or more mechanical fasteners, one or more adhesives, one or more welds, a splined connection and/or a threaded connection. Additionally, it is within the scope of this disclosure and as a non-limiting example, that the increased diameter portion 950 of the second shaft 944 may be a companion flange.

One or more increased diameter portion attachment apertures 956 extend from the first end portion 952 to the second end portion 954 of the increased diameter portion 950 of the second shaft 944. The one or more increased diameter portion attachment apertures 956 of the increased diameter portion 950 of the second shaft 944 are complementary to and aligned with the one or more flange portion attachment apertures 918 in the flange portion 906 of the second member 804 of the coupling assembly 800. As best seen in FIG. 14 of the disclosure, the one or more increased diameter portion attachment apertures 956 of the increased diameter portion 950 are of a size and shape to receive and/or retain at least a portion of the shaft portion 920 of the one or more mechanical fasteners 916. According to an embodiment of the disclosure and as a non-limiting example, at least a portion of a surface 958 defining the one or more increased diameter portion attachment apertures 956 are substantially smooth allowing at least a portion of the one or more mechanical fasteners 916 to be received within the one or more increased diameter portion attachment apertures 956. As a result, according to this embodiment of the disclosure and as a non-limiting example, the coupling assembly 800 may further include the use of a nut (not shown) that is meshingly engaged to the one or more mechanical fasteners 916 in order to tighten the second member 804 to the second shaft 944 of the coupling assembly 800.

In accordance with an alternative embodiment of the disclosure and as a non-limiting example, the surface 958 defining the one or more increased diameter portion attachment apertures 956 may include one or more threads (not shown) that are complementary to and meshingly engaged with the one or more threads 924 on the shaft portion 922 of the one or more mechanical fasteners 916. As a result, at least a portion of the one or more mechanical fasteners 916 may be received and/or retained within at least a portion of the one or more increased diameter portion attachment apertures 956 in the increased diameter portion 950 of the second shaft 944 of the coupling assembly 800.

According to the embodiment of the disclosure illustrated in FIG. 15 and as a non-limiting example, the one more flange portion attachment apertures 918 of the second member 804 and the one or more increased diameter portion attachment apertures 956 of the second shaft 944 may be disposed along one or more dimeters D3 from the center point CP2 of the coupling assembly 800. In accordance with the embodiment of the disclosure illustrated in FIG. 15 and as a non-limiting example, one or more of the one or more flange portion attachment apertures 918 and the one or more increased diameter portion attachment apertures 956 are disposed along an angle θ6 from the radial center-line C4 of the universal joint assembly 800. As a non-limiting example, the angle θ6 may be approximately 20° to approximately 65°.

As best seen in FIG. 13 of the disclosure and as a non-limiting example, the one or more mechanical fasteners 916, the one more flange portion attachment apertures 918 of the second member 804 and/or the one or more increased diameter portion attachment apertures 956 of the second shaft 944 may have a center-line C5 that is disposed at an angle θ7 relative to a axial center-line C6 of the coupling assembly 800. By placing the one or more mechanical fasteners 916, the one more flange portion attachment apertures 918 and/or the one or more increased diameter portion attachment apertures 956 at the angle θ7, it provides standard installation and/or removal tools 960 with the clearance needed to assemble and/or disassemble of the coupling assembly 800. As a result, the coupling assembly 800 may be assembled and/or disassembled without the use of specialized tools that needs to be intricately designed, machined and/or manufactured. In accordance with an embodiment of the disclosure and as a non-limiting example, the angles θ5 and/or θ7 may be substantially equal to one another. It is within the scope of this disclosure and as a non-limiting example, the angles θ5 and/or θ7 may be from approximately 6° to approximately 24°.

It is within the scope of this disclosure and as a non-limiting example that the one or more flange portion attachment apertures 918 in the second member 804 may be cast as part of the second member 804, drilled into the second member 804 and/or machined into the second member 804 of the coupling assembly 800. Additionally, it is within the scope of this disclosure and as a non-limiting example that the one or more increased diameter portion attachment apertures 956 in the second shaft 944 may be cast as part of the second shaft 944, drilled into the increased diameter portion 950 of the second shaft 944 and/or may be machined into the increased diameter portion 950 of the second shaft 944 of the coupling assembly 800.

According to the embodiment of the disclosure illustrated in FIG. 14 and as a non-limiting example, the second shaft 944 may further include a recessed portion 962 extending inward from at least a portion of the first end portion 952 of the increased diameter portion 950 of the second shaft 944. As best seen in FIG. 14 of the disclosure, the recessed portion 962 in the increased diameter portion 950 of the second shaft 944 is of a size and shape to receive and/or retain at least a portion of the axially extending portion 926 and/or the grease cap 932 of the coupling assembly 800.

Figure 16:
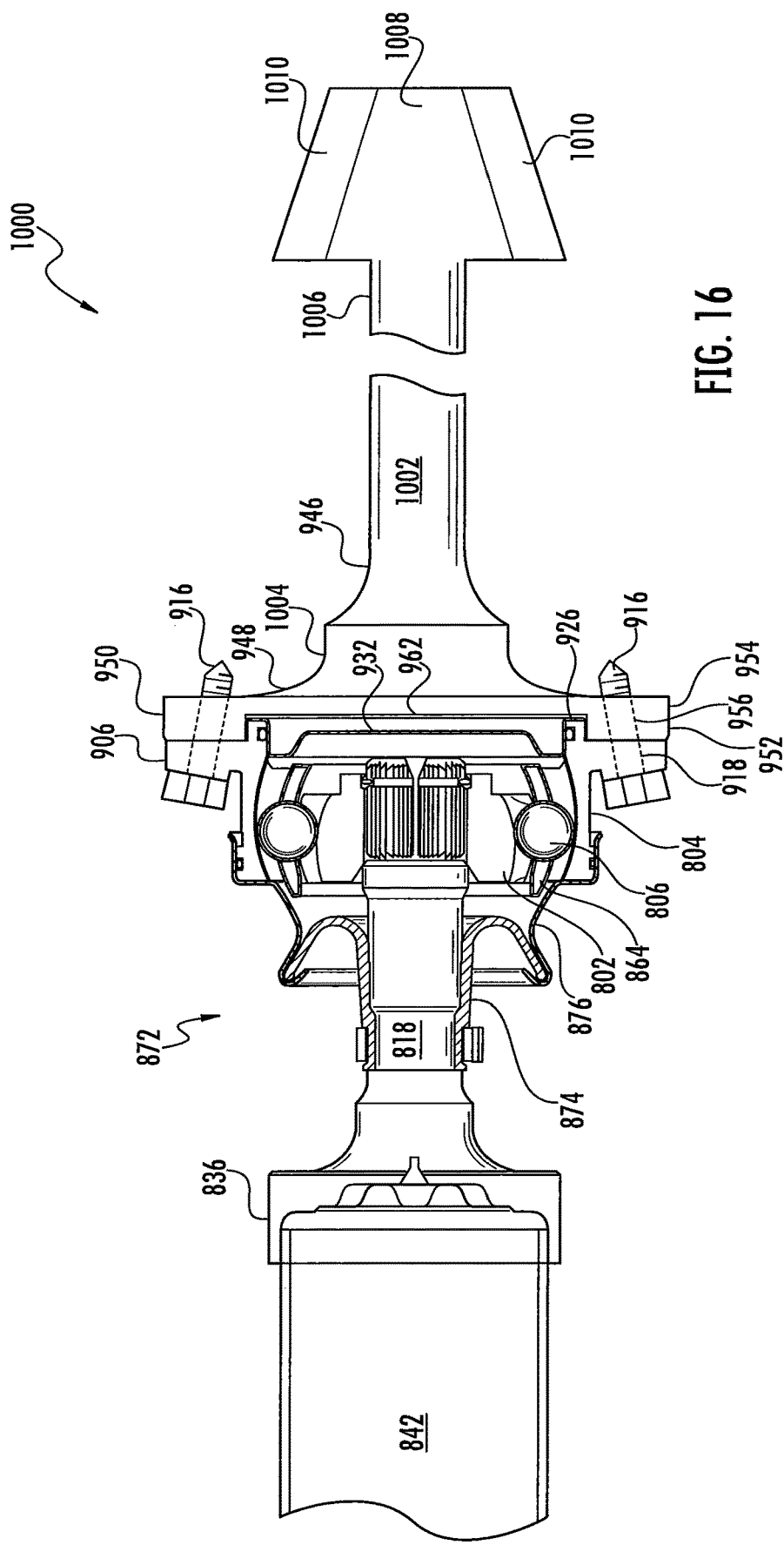
FIG. 16 is a cut-away schematic side-view of a coupling assembly having a second shaft according to an alternative embodiment of the disclosure.

FIG. 16 is a cut-away schematic side-view of a coupling assembly 1000 having a second shaft 1002 according to an alternative embodiment of the disclosure. The coupling assembly 1000 illustrated in FIG. 16 is the same as the coupling assemblies 400, 600, 650, 700, 750 and 800 illustrated in FIGS. 4-15, except where specifically noted below. Additionally, the second shaft 1002 of the coupling assembly 1000 is the same as the second shafts 496, 602, 652, 702, 752 and 944 of the coupling assemblies 400, 600, 650, 700, 750 and 800, except where specifically noted below. In accordance with the embodiment of the disclosure illustrated in FIG. 16 and as a non-limiting example, the second shaft 1002 further includes a second increased diameter portion 1004 circumferentially extending from at least a portion of the outer surface 946 of the first end portion 948 of the second shaft 1002. At least a portion of the second increased diameter portion 1004 on the first end portion 948 of the second shaft 1002 is disposed directly adjacent to at least a portion of the second end portion 954 of the increased diameter portion 950 of the second shaft 1002.

Connected to at least a portion of the outer surface 946 a second end portion 1006 of the second shaft 1002 is a pinion gear 1008. Circumferentially extending along at least a portion of the outer surface 946 of the pinion gear 1008 is a plurality of pinion gear teeth 1010. It is within the scope of this disclosure and as a non-limiting example that the pinion gear 1008 of the coupling assembly 1000 may be integrally formed as part of the second end portion 1006 of the second shaft 1002 or may be integrally connected to at least a portion of the second end portion 1006 of the second shaft 1002 by using one or more welds, one or more adhesives, one or more mechanical fasteners, a splined connection and/or a threaded connection. Additionally, it is within the scope of this disclosure and as a non-limiting example, that the plurality of pinion gear teeth 1010 of the pinion gear 1008 are complementary to and meshingly engaged with a plurality of ring gear teeth (not shown) on an outer surface (not shown) of a differential ring gear (not shown). As a non-limiting example, the second shaft 1002 may be a differential pinion shaft, a front axle differential pinion shaft, a rear axle differential pinion shaft and/or a rear tandem axle differential pinion shaft.

Figure 17:
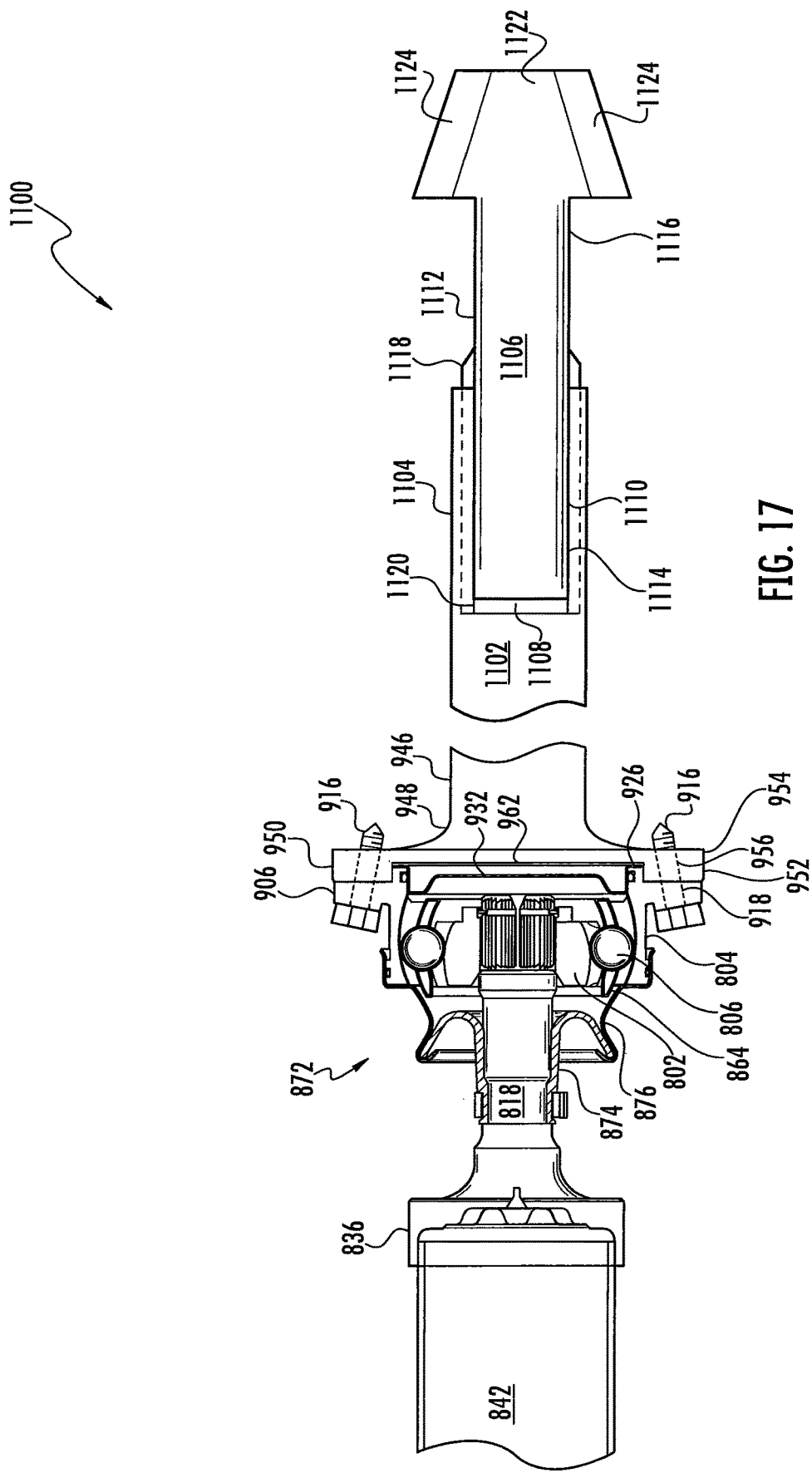
FIG. 17 is a cut-away schematic side-view of a coupling assembly having a second shaft according to another embodiment of the disclosure.

FIG. 17 is a cut-away schematic side-view of a coupling assembly 1100 having a second shaft 1102 according to another embodiment of the disclosure. The coupling assembly 1100 illustrated in FIG. 17 is the same as the coupling assemblies 400, 600, 650, 700, 750, 800 and 1000 illustrated in FIGS. 4-16, except where specifically noted below. Additionally, the second shaft 1102 of the coupling assembly 1100 is the same as the second shafts 496, 602, 652, 702, 752, 944 and 1002 of the coupling assemblies 400, 600, 650, 700, 750, 800 and 1000, except where specifically noted below. In accordance with this embodiment of the disclosure, the second shaft 1102 does not include the second increased diameter portion 1004 as illustrated in FIG. 16 of the disclosure.

As illustrated in FIG. 17 of the disclosure and as a non-limiting example, at least a portion of a second end portion 1104 of the second shaft 1102 is drivingly connected to at least a portion of a third shaft 1106. Extending inward from an end of the second shaft 1102, opposite the increased diameter portion 950, is a hollow interior portion 1108 defined by an inner surface 1110. The hollow interior portion 1108 of the second end portion 1104 of the second shaft 1102 is of a size and shape to receive and/or retain at least a portion of the third shaft 1106.

The third shaft 1106 has an outer surface 1112, a first end portion 1114 and a second end portion 1116. Circumferentially extending along at least a portion of the outer surface 1112 of the first end portion 1114 of the third shaft 1106 is a plurality of axially extending third shaft splines 1118. As illustrated in FIG. 17 of the disclosure, the plurality of axially extending third shaft splines 1118 are complementary to and meshingly engaged with a plurality of axially extending second shaft splines 1120 circumferentially extending along at least a portion of the inner surface 1110 defining the hollow interior portion 1108 in at least a portion of the second end portion 1104 of the second shaft 1102.

Connected to at least a portion of the outer surface 1112 of the second end portion 1116 of the third shaft 1106 is a pinion gear 1122. Circumferentially extending along at least a portion of the outer surface 1112 of the pinion gear 1122 is a plurality of pinion gear teeth 1124. It is within the scope of this disclosure and as a non-limiting example that the pinion gear 1122 of the coupling assembly 1100 may be integrally formed as part of the second end portion 1112 of the third shaft 1106 or may be integrally connected to at least a portion of the second end portion 1116 of the third shaft 1106 by using one or more welds, one or more adhesives, one or more mechanical fasteners, a splined connection and/or a threaded connection. Additionally, it is within the scope of this disclosure and as a non-limiting example, that the plurality of pinion gear teeth 1124 of the pinion gear 1122 are complementary to and meshingly engaged with a plurality of ring gear teeth (not shown) on an outer surface (not shown) of a differential ring gear (not shown). As a non-limiting example, the third shaft 1106 may be differential pinion shaft, a front axle differential pinion shaft, a rear axle differential pinion shaft and/or a rear tandem axle differential pinion shaft.

Figure 18:
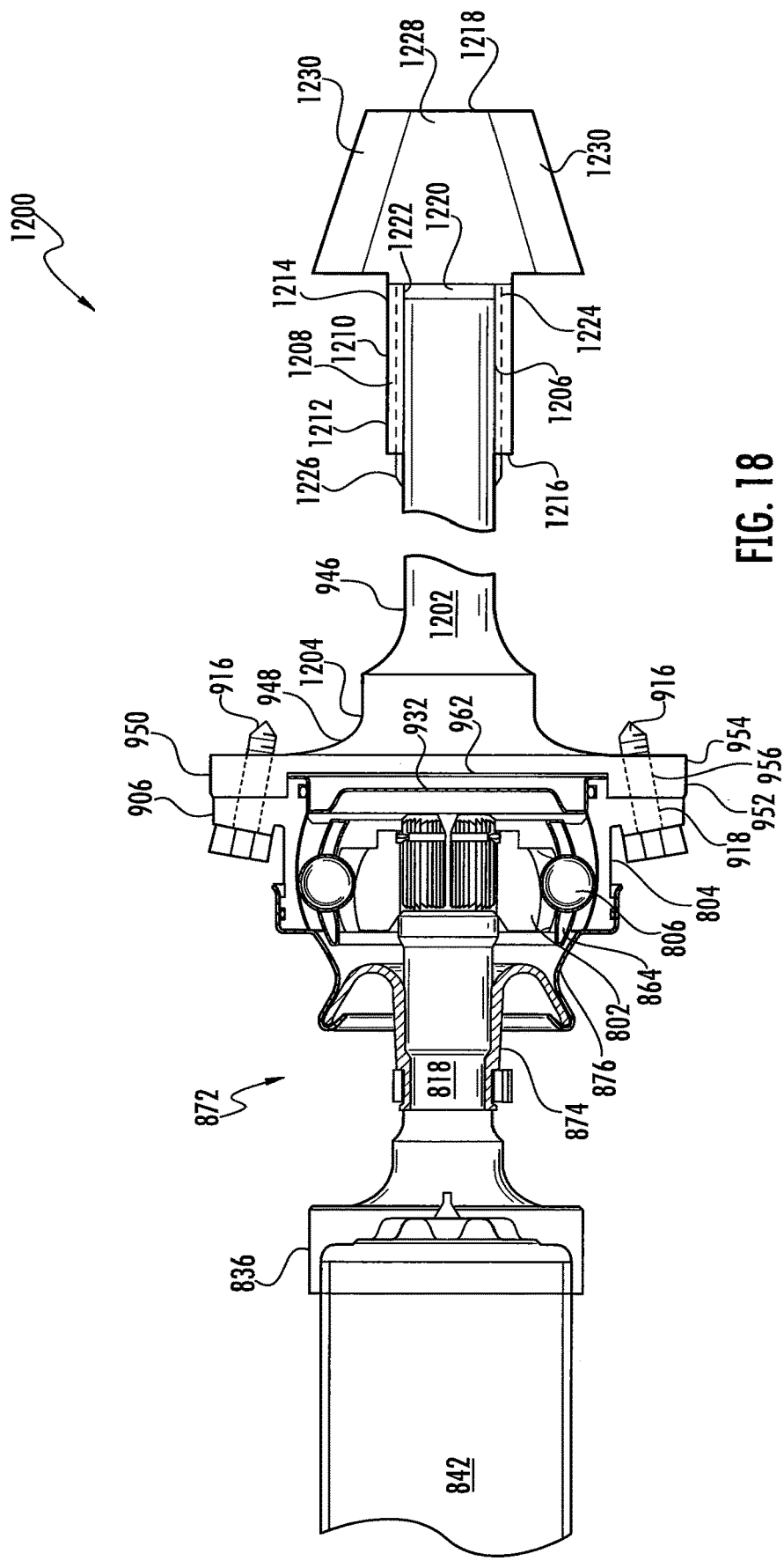
FIG. 18 is a cut-away schematic side-view of a coupling assembly having a second shaft according to yet another embodiment of the disclosure.

FIG. 18 is a cut-away schematic side-view of a coupling assembly 1200 having a second shaft 1202 according to yet another embodiment of the disclosure. The coupling assembly 1200 illustrated in FIG. 18 is the same as the coupling assemblies 400, 600, 650, 700, 750, 800, 1000 and 1100 illustrated in FIGS. 4-17, except where specifically noted below. Additionally, the second shaft 1202 of the coupling assembly 1200 is the same as the second shafts 496, 602, 652, 702, 752, 944, 1002 and 1102 of the coupling assemblies 400, 600, 650, 700, 750, 800, 1000 and 1100, except where specifically noted below. As illustrated in FIG. 18 of the disclosure and as non-limiting example, the second shaft 1202 may include a second increased diameter portion 1204 circumferentially extending from at least a portion of the outer surface 946 of the first end portion 948 of the second shaft 1202. In accordance with the embodiment of the disclosure illustrated in FIG. 18 and as a non-limiting example, the second increased diameter portion 1204 of the second shaft 1202 is disposed directly adjacent to at least a portion of the second end portion 954 of the increased diameter portion 950 of the second shaft 1202.

Drivingly connected to at least a portion of a second end portion 1206 of the second shaft 1202 is a third shaft 1208 having an outer surface 1210, a first end portion 1212, a second end portion 1214, a first end 1216 and a second end 1218. Extending inward from at least a portion of the first end 1216 of the third shaft 1208 is a hollow interior portion 1220 that is defined by an interior surface 1222. Circumferentially extending along at least a portion of the inner surface 1222 defining the hollow interior portion 1220 in at least a portion of the first end portion 1212 of the third shaft 1208 is a plurality of axially extending third shaft splines 1224. The plurality of axially extending third shaft splines 1224 are complementary to and meshingly engaged with a plurality of axially extending second shaft splines 1226 circumferentially extending from at least a portion of the second end portion 1206 of the second shaft 1202. As a result, the hollow interior portion 1220 of the third shaft 1208 is of a size and shape to receive and/or retain at least a portion of the second end portion 1206 of the second shaft 1202 of the coupling assembly 1200.

Connected to at least a portion of the second end portion 1214 of the third shaft 1208 is a pinion gear 1228. Circumferentially extending from art least a portion of the outer surface 1210 of the pinion gear 1228 is a plurality of pinion gear teeth 1230. It is within the scope of this disclosure and as a non-limiting example that the pinion gear 1228 of the coupling assembly 1200 may be integrally formed as part of the second end portion 1214 of the third shaft 1208 or may be integrally connected to at least a portion of the second end portion 1214 of the third shaft 1208 by using one or more welds, one or more adhesives, one or more mechanical fasteners, a splined connection and/or a threaded connection. Additionally, it is within the scope of this disclosure and as a non-limiting example, that the plurality of pinion gear teeth 1230 of the pinion gear 1228 are complementary to and meshingly engaged with a plurality of ring gear teeth (not shown) on an outer surface (not shown) of a differential ring gear (not shown). As a non-limiting example, the third shaft 1208 may be differential pinion shaft, a front axle differential pinion shaft, a rear axle differential pinion shaft and/or a rear tandem axle differential pinion shaft.

It is within the scope of this disclosure that the various embodiments of the disclosure described and illustrated herein may be combined with one another to make an axle system according to an embodiment of the disclosure.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed:

1. A coupling assembly, comprising:
   a universal joint assembly comprising: a first member, a second member and one or more third members;
      wherein said one or more third members drivingly connect said first member of said coupling assembly to said second member of said coupling assembly;
      wherein said first member of said coupling assembly has an outer surface, a first end portion, a second end portion and an intermediate portion interposed between the first and second end portions of the first member;
      wherein said first end portion of said first member of said coupling assembly has a substantially cylindrical portion;
      wherein said intermediate portion includes a tapered portion, said tapered portion has a diameter D1 that decreases from a first end portion of said tapered portion to a second end portion of said tapered portion such that the tapered portion extends at an angle θ1 relative to an axial center-line C1 of said coupling assembly;
      wherein said second member has a flange portion with an outer surface, a first end portion and a second end portion;
      wherein one or more seating portions extend along at least a portion of said outer surface of said first end portion of said flange portion of said second member of said coupling assembly;
      wherein said one or more seating portions on said first end portion of said flange portion of said second member extend at an angle θ2 relative to a radial center-line C2 of said coupling assembly;
      wherein one or more flange portion attachment apertures extending from said one or more seating portions on said first end portion of said flange portion to said second end portion of said flange portion of said second member;
   a first shaft;
      wherein at least a portion of said first shaft is drivingly connected to at least a portion of said substantially cylindrical portion of said first member of said coupling assembly;
   a second shaft having an outer surface, a first end portion and a second end portion;
      wherein an increased diameter portion having a first end portion and a second end portion extends from at least a portion of said outer surface of said first end portion of said second shaft;
      wherein one or more increased diameter portion attachment apertures extend from said first end portion to said second end portion of said increased diameter portion of said second shaft;
      wherein said one or more increased diameter portion attachment apertures are complementary to and aligned with said one or more flange portion attachment apertures;
      wherein said one or more increased diameter portion attachment apertures and said one or more flange portion attachment apertures are disposed along an angle θ3 from said radial center-line C2 of said coupling assembly;
      wherein said one or more increased diameter portion attachment apertures and said one or more flange portion attachment apertures have a center-line C3 that is disposed at an angle θ4 relative to said axial center-line C1 of said coupling assembly;
   one or more mechanical fasteners;
      wherein said one or more mechanical fasteners have a size and shape to be received and/or retained within said one or more increased diameter portion attachment apertures in said second shaft and said one or more flange portion attachment apertures in said second member of said coupling assembly; and
      wherein said angles θ1, θ2 and θ4 are substantially equal to one another.

2. The coupling assembly of claim 1,
   wherein a first yoke arm extends outward from at least a portion of said first member;
   wherein a first yoke arm opening extends from a first side to a second side of said first yoke arm of said first member;
   wherein a second yoke arm extends outward from at least a portion of said first member;
   wherein a second yoke arm opening extends from a first side to a second side of said second yoke arm of said first member; and
   wherein said first yoke arm opening in said first yoke arm of said first member is aligned with said second yoke arm opening in said second yoke arm of said first member.

3. The coupling assembly of claim 2, wherein said second member further comprises a first yoke arm and a second yoke arm;
   wherein said first yoke arm extends outward from at least a portion of said second member;
   wherein a first yoke arm opening extends from a first side to a second side of said first yoke arm of said second member of said coupling assembly;
   wherein said second yoke arm extends outward from at least a portion of said second member;
   wherein a second yoke arm opening extends from a first side to a second side of said second yoke arm of said second member of said coupling assembly; and
   wherein said first yoke arm opening in said first yoke arm of said second member is aligned with said second yoke arm opening in said second yoke arm of said second member of said coupling assembly.

4. The coupling assembly of claim 3, further comprising a plurality of bearing cap assemblies;
   wherein at least a portion of said plurality of bearing cap assemblies are connected to at least a portion of an outer surface of a plurality of trunnions extending outward from at least a portion of a body portion of said one or more third members; and
   wherein said first yoke arm opening in said first yoke arm of said first member, said second yoke arm opening in said second yoke arm of said first member, said first yoke arm opening in said first yoke arm of said second member and said second yoke arm opening of said second yoke arm of said second member have a size and shape to receive and/or retain at least a portion of said one or more of said plurality of bearing cap assemblies on said outer surface of said plurality of trunnions of said one or more third members of said coupling assembly.

5. The coupling assembly of claim 1, wherein said second shaft further comprises a pinion gear; and
   wherein at least a portion of said second end portion of said second shaft is connected to at least a portion of said pinion gear.

6. The coupling assembly of claim 1, further comprising a third shaft having a first end portion and a second end portion;
   wherein at least a portion of said second end portion of said second shaft is drivingly connected to at least a portion of said first end portion of said third shaft; and
   wherein at least a portion of a pinion gear is connected to at least a portion of said second end portion of said third shaft.

7. A coupling assembly, comprising:
   a constant velocity joint assembly comprising a first member, a second member and one or more third members drivingly connecting said first member to said second member of said coupling assembly;
   wherein said second member of said coupling assembly has an outer surface, a first end portion and a second end portion;
   wherein a flange portion circumferentially extends from at least a portion of said outer surface of said second end portion of said second member of said coupling assembly;
   wherein said flange portion has one or more seating portions extending at an angle θ5 relative to a radial center-line of the coupling assembly;
   wherein one or more flange portion attachment apertures extend from a first end portion to a second end portion of said flange portion of said second member of said coupling assembly;
   a stub shaft having a first end portion and a second end portion;
   wherein said stub shaft has an increased diameter portion circumferentially extending from at least a portion of an outer surface of said first end portion of said stub shaft;
   wherein at least a portion of said increased diameter portion of said stub shaft is drivingly connected to at least a portion of a first shaft;
   wherein at least a portion of said second end portion of said stub shaft is drivingly connected to at least a portion of said first member of said coupling assembly;
   a second shaft having an outer surface, a first end portion and a second end portion;
   wherein an increased diameter portion having a first end portion and a second end portion circumferentially extends from at least a portion of said outer surface of said first end portion of said second shaft;
   wherein one or more increased diameter portion attachment apertures extend from said first end portion to said second end portion of said increased diameter portion of said second shaft;
   wherein said one or more increased diameter portion attachment apertures of said second shaft are complementary to and aligned with said one or more flange portion attachment apertures of said flange portion of said second member;
   wherein said one or more increased diameter portion attachment apertures and said one or more flange portion attachment apertures are disposed along an angle from said radial center-line of said coupling assembly;
   wherein said one or more increased diameter portion attachment apertures and said one or more flange portion attachment apertures have a center-line that is disposed at an angle relative to an axial center-line of said coupling assembly; one or more mechanical fasteners;
   wherein said one or more mechanical fasteners have a size and shape to be received and/or retained within said one or more increased diameter portion attachment apertures in said second shaft and said one or more flange portion attachment apertures in said second member of said coupling assembly;
   wherein said second member further comprises an axially extending portion;
   wherein said axially extending portion of said second member extends outward from at least a portion of said second end portion of said flange portion of said second member of said coupling assembly; and
   wherein at least a portion of said axially extending portion of said second member is disposed radially inward from at least a portion of said one or more flange portion attachment apertures in said flange portion of said second member of said coupling assembly.

8. The coupling assembly of claim 7, further comprising a boot assembly;
   wherein said boot assembly comprises a flexible boot and a boot can;
   wherein at least a portion of a first end portion of said flexible boot is sealingly engaged with at least a portion of said stub shaft;
   wherein at least a portion of a second end portion of said flexible boot is sealingly engaged with at least a portion of a first end portion of said boot can; and
   wherein at least a portion of a second end portion of said boot can is sealingly engaged with at least a portion of said second member of said coupling assembly.

9. The coupling assembly of claim 7, wherein said coupling assembly further comprises a grease cap;
   wherein said grease cap comprises a radially outward extending lip, an axially inward extending portion, a radially inward extending portion, an arcuate portion and a radially extending portion; and
   wherein at least a portion of said axially inward extending portion and radially outward extending lip of said grease cap is in direct contact with and sealingly engaged with said axially extending portion of said second member of said coupling assembly.

10. The coupling assembly of claim 9, wherein said grease cap has a length L1 and a length L2;
   wherein said length L1 extends from said radially inward extending portion of said grease cap to said radially extending portion of said grease cap;
   wherein said length L2 extends from said radially inward extending portion of said grease cap to said radially outward extending lip of said grease cap; and
   wherein said length L1 is less than said length L2 of said grease cap.

11. The coupling assembly of claim 9, wherein said second member of said coupling assembly further comprises an O-ring groove and one or more O-rings;
   wherein said O-ring groove circumferentially extends along at least a portion of an inner surface of said axially extending portion of said second member of said coupling assembly;
   wherein at least a portion of said one or more O-rings are disposed within said O-ring groove in said inner surface of said axially extending portion of said second member of said coupling assembly; and
   wherein at least a portion of said axially inward extending portion of said grease cap is in direct contact with and is sealingly engaged with at least a portion of said one or more O-rings in said O-ring groove.

12. The coupling assembly of claim 9, wherein said increased diameter portion of said second shaft further comprises a recessed portion;
   wherein said recessed portion extends inward from at least a portion of said second end portion of said increased diameter portion of said second shaft; and
   wherein said recessed portion is of a size and shape to receive and/or retain at least a portion of said axially extending portion and said grease cap of said coupling assembly.

* * * * *